US011332650B2

(12) United States Patent
Zahir et al.

(10) Patent No.: US 11,332,650 B2
(45) Date of Patent: May 17, 2022

(54) SHAPE-STABILIZED PHASE CHANGE MATERIALS FOR ENERGY STORAGE BASED ON HIERARCHICALLY POROUS CALCIUM MAGNESIUM CARBONATE

(71) Applicant: KING FAHD UNIVERSITY OF PETROLEUM AND MINERALS, Dhahran (SA)

(72) Inventors: Md. Hasan Zahir, Dhahran (SA); Mohammed Mozahar Hossain, Dhahran (SA); Md. Shafiullah, Dhahran (SA); Abbas Saeed Hakeem, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 260 days.

(21) Appl. No.: 16/684,738

(22) Filed: Nov. 15, 2019

(65) Prior Publication Data

US 2021/0147736 A1    May 20, 2021

(51) Int. Cl.
*C09K 5/06*     (2006.01)
*F28D 20/02*    (2006.01)

(52) U.S. Cl.
CPC .............. *C09K 5/063* (2013.01); *F28D 20/02* (2013.01); *Y02E 60/14* (2013.01)

(58) Field of Classification Search
CPC ........... C09K 5/06; C09K 5/063; F28D 20/02; Y02E 60/14; C01F 5/24; C01F 11/18
See application file for complete search history.

(56) References Cited

U.S. PATENT DOCUMENTS 4,447,347 A * 5/1984 Goldfarb ................ C09K 5/063
                                                      252/70
9,493,695 B2 * 11/2016 Ram ...................... C09K 5/063
(Continued)

FOREIGN PATENT DOCUMENTS

| CN | 4236015 B2   |   | 3/2009  |
|----|--------------|---|---------|
| CN | 104152114 A  | * | 11/2014 |
| CN | 107365121 A  | * | 11/2017 |

(Continued)

OTHER PUBLICATIONS

English language machine translation of Hojo et al. (WO 2004/024628 A1) (Year: 2004).*

(Continued)

*Primary Examiner* — Matthew R Diaz
(74) *Attorney, Agent, or Firm* — Oblon, McClelland, Maier & Neustadt, L.L.P.

(57) ABSTRACT

A composite phase-change material containing a hierarchically porous $Ca_{1-x}Mg_xCO_3$ and having pores loaded with a phase change material is described. The heat storage material has a latent heat of melting 123 to 221 J/g, a latent heat of freezing of 107 to 201 J/g, and a thermal conductivity of 0.22 to 0.45 W·m$^{-1}$·K$^{-1}$. The phase change material may be polyethylene glycol, and the polyethylene glycol does not leak from the pores of the hierarchically porous $Ca_{1-x}Mg_xCO_3$ when heating or cooling over phase transitions.

20 Claims, 10 Drawing Sheets

(56) References Cited

U.S. PATENT DOCUMENTS

| | | | |
|---|---|---|---|
| 2013/0204333 A1* | 8/2013 | Huff | A61F 7/10 |
| | | | 252/70 |
| 2013/0298991 A1* | 11/2013 | Parker | C09K 5/02 |
| | | | 136/259 |

FOREIGN PATENT DOCUMENTS

| | | | | |
|---|---|---|---|---|
| CN | 107365569 A | * | 11/2017 | |
| CN | 107365569 A | | 11/2017 | |
| CN | 108623281 A | | 10/2018 | |
| CN | 107640781 B | | 4/2019 | |
| JP | 2006-151712 A | | 6/2006 | |
| WO | WO 2004/024628 A1 | | 3/2004 | |
| WO | WO-2004024628 A1 | * | 3/2004 | C01F 11/18 |

OTHER PUBLICATIONS

English language machine translation of Gao et al. (CN 104152114 A) (Year: 2014).*

English language machine translation of Liang et al. (CN 107365121 A) (Year: 2017).*

English language machine translation of Zuo et al. (CN 107365569 A) (Year: 2017).*

Madhura Deshpande, "Polyethylene glycol / Calcium carbonate composite as a form stable Phase Change Material for Thermal Energy Storage", International Conference on Renewable Energy, Conference Programme, Apr. 25-27, 2018, 1 page (Abstract only).

Guo-Qiang Qi, et al., "Polyethylene glycol based shape-stabilized phase change material for thermal energy storage with ultra-low content of graphene oxide", Solar Energy Materials and Solar Cells, vol. 123, Apr. 2014, pp. 171-177 (Abstract only).

Heqing Tian, et al., "Enhanced thermal conductivity of ternary carbonate salt phase change material with Mg particles for solar thermal energy storage", Applied Energy, vol. 204, Oct. 15, 2017, pp. 525-530 (Abstract only).

Zengsheng Weng, et al., "Fabrication of high thermal conductive shape-stabilized polyethylene glycol/silican phase change composite by two-step sol gel method", Composites Part A: Applied Science and Manufacturing, vol. 110, Jul. 2018, pp. 106-112 (Abstract only).

* cited by examiner

SHAPE-STABILIZED PHASE CHANGE MATERIALS FOR ENERGY STORAGE BASED ON HIERARCHICALLY POROUS CALCIUM MAGNESIUM CARBONATE

STATEMENT OF ACKNOWLEDGEMENT

This project was prepared with financial support provided by the Deanship of Scientific Research (DSR) at King Fand University of Petroleum & Minerals (KFUPM) through project No. IN-171036 and support provided by the King Abdullah City for Atomic and Renewable Energy (KACARE).

BACKGROUND OF THE INVENTION

Technical Field

The present invention relates to a composite phase-change material comprising a carbonate matrix of the formula $Ca_{1-x}Mg_xCO_3$ where x=0.01 to 0.25 having a hierarchical pore structure of mesopores and macropores loaded with an organic phase-change substance.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Non-renewable resources such as fossil fuels have many drawbacks, such as limited availability and the emission of harmful gasses upon use. The world is switching to new renewable energy sources as a result. Latent heat storage through phase-change materials (PCMs) is one of the most promising techniques employed in this area. Due to their extremely small variation in temperature, isothermal operating conditions, and high density of energy storage, PCMs have turned out to be a hotspot of research in fields such as air-conditioning systems, solar heating systems, thermal regulation and insulation, energy conservation of buildings, and the recovery of waste heat. [Mohamed S A, et. al., Renewable Sustainable Energy Rev., 2016, 70, 1078-1089; Zhong, L M, et. al., Sol Energy 2014, 107, 298-306 and Zahir M H, et. al., Applied Energy, 2019, 240, 793-817]. An efficient system of storing solar thermal energy, collected throughout the daytime, is required to store the excess heat to be used during the nighttime. Heat recovery systems face the same problem, as the periods of availability of waste heat and its utilization do not coincide, requiring the storage of thermal energy.

With PCMs, the density of energy storage is much higher and is within a smaller temperature range when compared to other methods of storing heat. Consequently many applications employ PCMs for latent heat storage. PCMs were found to be effective for portable thermal batteries [Han G G D, et. al., Nat Commun., 2017, 8, 1446], thermoregulating textiles [Iqbal K, and Sun D, Renew Energy, 2014, 71, 473-9; and Gao T, et. al., ACS Nano, 2017, 11, 11513-20], water heaters [Kee S Y, et. al., Appl Therm Eng, 2018, 131, 455-71], smart thermal microgrids [Kuznik F, et. al., In: Adv therm energy storage syst., Woodhead Publishing, 2015, 325-53; and Pereira da Cunha J, and Eames P, Appl Energy, 2016, 177, 227-38], indoor thermal management systems [Lee K O, et. al., Sol Energy, 2018, 163, 113-21], refrigerators [Khan M M A, et. al., Renew Sustain Energy Rev, 2017, 76, 105-37.], solar-driven cookers [Pandey A K, et. al., Renew Sustain Energy Rev, 2018, 82, 281-323.] etc. Depending on the application, the selection of the PCMs should be based on their temperature of melting. For air-conditioning applications, PCMs that melt below 15° C. are suitable for "coolness storage", whereas PCMs that have a melting temperature above 90° C. are suitable for absorption refrigeration. The PCMs that have a melting temperature between 15° C. and 90° C. are suitable for applications in heat-load leveling and solar heating. This class represents the most studied PCMs [Farid, M. M., et. al., Energy Conversion and Management, 2004, 45, 1597-1615.].

Hydrated salts have a relatively high thermal conductivity, a high volumetric storage density, and a relatively low cost compared to paraffin waxes. Hence, they are good candidates for storing thermal energy. However, they degrade when heated at elevated temperatures by losing some of their water content with every heating cycle. Moreover, supercooling and phase separation are also shortcomings of salt hydrates, which limit their applications. On the other hand, organic solid to liquid PCMs such as polyethylene glycol, paraffin waxes, and fatty acids represent the most extensively used materials for heat storage [Kenisarin M M., Sol Energy, 2014, 107, 553-75; and Zhang N, et. al., Adv Eng Mater, 2018, 20, 1700753.] due to their ability to self-nucleate and decent thermal reliability [Abhat A., Sol Energy, 1983, 30, 313-32; and Memon S A., Renew Sustain Energy Rev, 2014, 31, 870-906]. However, leakage problems and the low conductivity of organic PCMs can lead to device failure or cause serious contamination damage, especially when they are used in electronic equipment and packaging. Shape-stabilization, which involves the impregnation of the PCM into a supporting matrix, is considered to be the most effective strategy to overcome above shortcomings.

Several matrices, including expanded graphite (EG), polymers, and metal foams have been employed for microencapsulation or impregnation of PCMs to form shape-stabilized phase-change materials (ss-PCMs) [Kenisarin M M, and Kenisarina K M, Renew Sustain Energy Rev, 2012, 16, 1999-2040]. Microencapsulation primarily suffers from limited fields of application, low rate of heat transfer, and the high cost of the microencapsulation process [Jamekhorshid A, et. al., Renew Sustain Energy Rev, 2014, 31, 531-542; Liu L, et. al., Renew Sustain Energy Rev, 2016, 66, 399-414; Jacob R, et. al., Renew Sustain Energy Rev, 2015, 48, 79-87; and Konuklu Y, et. al., Energy Build, 2015, 106, 134-155]. Nonetheless, PCMs packaged within porous supports provide a more effective route to produce ss-PCMs with improved and enhanced mechanical strength, thermal conductivity, flame resistance, and chemical stability. Many applications, such as energy storage and conversion, catalysis, and adsorption have widely used porous materials with good properties of mass transfer, pores with a high volume, high storage capacities, and high specific surface areas [Huang X, et. al., Green Chem, 2017, 19, 769-777; Huang X, et. al., J Mater Chem A, 2015, 3, 13468-13475; Huang X, et. al., Chem Sci, 2018, 9, 3623-3637; Huang X, et. al., Micropor Mesopor Mater, 2015, 207, 105-110; and Zhang Y, et. al., Chem Eng J, 2018, 344, 402-409]. Moreover, many previous studies have also used porous materials, including MgO [Yonggan, H, et. al., Thermochimica Acta, 2015, 604, 45-51], $CaCO_3$ [Shudong, Z, et. al., Cryst Eng Comm, 2010, 12, 3571-3578], and $SiO_2$ [Wang W, et. al., Applied Energy, 2009, 86, 2, 170-174] to confine PCMs and prevent leakage.

Shudong et al. have reported that $CaCO_3$ with different pore sizes can effectively reduce the phase separation phenomena and supercooling effect of PCMs. However, the preparation of the starting precursor calcium oxalate dihydrate is very time consuming and costly. $MgCO_3$ is also well known as a nontoxic, low cost, and environmental friendly porous supporter. Of interest is porous $MgCO_3$ due to the fact that the morphology is very similar to that of $CaCO_3$, which has been shown to be a good porous support [Zhang Z, et. al., J Phys Chem B, 2006, 110, 12969-73]. An important property of $CaCO_3$ is that it can be considered essentially as a biomaterial due to its perfect biocompatibility and biodegradability. Furthermore, the price of $CaCO_3$ is very low, and it is not toxic [Li T, et. al., Materials Letters, 2017, 193, 38-4].

Mesalhy et al. [Mesalhy O, et. al., Energy Conversion and Management, 2005, 46, 6, 847-867.] found that the presence of a porous matrix can positively affect the heat transfer and melting rate of a PCM during energy storage. Wu and Zhao conducted an experimental investigation of the enhancement of heat transfer of PCM-based thermal energy storage systems by porous materials [Wu Z G, and Zhao C, Solar Energy, 2011, 85, 7, 1371-1380.]. They used metal foams and expanded graphite as the porous material with $NaNO_3$ as the PCM. The application of porous materials depends on their porosity, pore size, pore size distribution, pore shape, pore morphology, and the specific surface area. In fact, porosity has a large influence on the mechanical, physical, and chemical properties of the materials. Recently, Qian et al. synthesized calcium silicate with a mesoporous structure and used it to form an ss-PCM with polyethylene glycol (PEG) by means of the impregnation method and facile blending. This ss-PCM effectively reduced the solidifying and melting time as well as the extent of supercooling of pure PEG [Qian T, et. al., Energy, 2015, 82, 333-340]. Recently, Wang et al. fabricated a novel composite ss-PCM based on PEG and inorganic hydroxyapatite $(Ca_{10}(PO_4)_6(OH)_2)$ by impregnation [Wang Y, et. al., Applied Thermal Engineering, 2017, 113, 1475-1482]. Further, hydrothermal synthesis is a promising low-temperature and low-cost fabrication method for porous or nanocrystalline materials that may be used as supports for ss-PCMs.

In view of the foregoing, one objective of the present invention is the preparation of a carbonate matrix of the formula $Ca_{1-x}Mg_xCO_3$ where $x=0.01$ to $0.25$ having a hierarchical pore structure of mesopores and macropores by the hydrothermal method. In one aspect, a synthesized carbonate matrix can be mixed with PEG or a PEG blend in order to fabricate the composite phase-change material.

BRIEF SUMMARY OF THE INVENTION

According to a first aspect, the present disclosure relates to a heat storage material. The heat storage material comprises a composite phase-change material, comprising an organic phase-change substance a carbonate matrix of the formula $Ca_{1-x}Mg_xCO_3$ where $x=0.01$ to $0.25$, and wherein the carbonate matrix is crystalline and has a hierarchical pore structure of mesopores and macropores.

In some embodiments, the carbonate matrix is in the form of nanoparticles having a mean size of 400 to 700 nm.

In some embodiments, mesopores have a modal size from 10 to 20 nm and the macropores have a modal size from 40 to 80 nm.

In some embodiments, the carbonate matrix has a pore volume of 0.025 to 0.045 $cm^3g^{-1}$.

In some embodiments, the carbonate matrix has a surface area of 7.5 to 12.5 m2/g.

In some embodiments, the organic phase-change substance is present in an amount of 60 to 80 wt % based on a total weight of the composite phase-change material.

In some embodiments, wherein the organic phase-change substance is at least one selected from the group consisting of a polyether, a polyolefin, a polyamide, a polycarbonate, a polyester, a petroleum wax, an animal-derived wax, a plant-derived wax, a fatty acid or fatty acid ester, and a sugar alcohol.

In preferred embodiments, the organic phase-change substance is a polyether having an enthalpy of fusion of 93 to 270 J/g.

In preferred embodiments, organic phase-change substance is polyethylene glycol having a weight average molecular weight in a range of 4,000 to 8,000 Da.

In some embodiments, the organic phase-change substance has a melting temperature that is 16.5 to 21.34° C. different from its solidifying temperature.

In some embodiments, 80 to 100 vol % of the pore volume is occupied by the organic phase-change substance.

In preferred embodiments, less than 10 wt % of the organic phase-change substance located in the pores, relative to a total weight of the organic phase-change substance located in the pores, exits the pores when the organic phase-change substance undergoes a melting or a solidifying transition.

In preferred embodiments, the composite phase-change material has a latent heat of freezing of 107 to 201 J/g and a latent heat of melting of 123 to 221 J/g.

In some embodiments, the composite phase-change material has a thermal conductivity of 0.220 to 0.45 $W \cdot m^{-1} \cdot K^{-1}$.

The present disclosure also relates a method for forming the composite phase-change material comprising hydrothermally reacting calcium nitrate, magnesium nitrate, and a carbonate base or bicarbonate base in water in a closed vessel at a temperature of 120 to 280° C. for 12 to 36 h to form a precipitate, washing and drying the precipitate to form the carbonate matrix, mixing the carbonate matrix with a solution comprising the organic phase-change substance and an organic solvent to form an impregnation mixture, and drying the impregnation mixture to form the composite phase-change material.

In some embodiments, the hydrothermally reacting consists essentially of mixing calcium nitrate, magnesium nitrate in water, adding a carbonate base or bicarbonate base until the pH is 7.5 to 9.5, stirring for 1-3 hours, transferring to a closed vessel, and heating to a temperature of 120 to 280° C. for 12 to 36 h.

In some embodiments, the mixing comprises stirring the carbonate matrix and the solution for 1 to 60 minutes and ultrasonicating for 1 to 60 minutes.

In some embodiments, the solution comprises the organic phase-change substance at a concentration of 7.5 to 12.5 g/L and the impregnation mixture comprises the carbonate matrix at a concentration of 3 to 5 g/L.

In some embodiments, the drying comprises heating the impregnation mixture to 60 to 100° C. for 12 to 36 hours.

The present disclosure also relates a building material comprising the composite phase-change material.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 1A depicts a dendritic network of pores, and FIG. 1B depicts an interconnected pore network;

FIG. 2A is for $5MgCaCO_3$, FIG. 2B is for $10MgCaCO_3$, and FIG. 2C is for $15MgCaCO_3$;

FIG. 3A is for PEG-6000, FIG. 3B is for PEG-6000/$5MgCaCO_3$, FIG. 3C is for PEG-6000/$10MgCaCO_3$, and FIG. 3D is for PEG-6000/$15MgCaCO_3$;

FIG. 4A is for $5MgCaCO_3$, FIG. 4B is for $10MgCaCO_3$, FIG. 4C is for $15MgCaCO_3$, FIG. 4D is for PEG-6000, FIG. 4E is for PEG-6000/$5MgCaCO_3$, FIG. 4F is for PEG-6000/$10MgCaCO_3$, and FIG. 4G is for PEG-6000/$15MgCaCO_3$;

FIG. 5A is for $5MgCaCO_3$, FIG. 5B is for $10MgCaCO_3$, and FIG. 5C is for $15MgCaCO_3$;

FIG. 6A is an SEM image of a Mg-free carbonate matrix $CaCO_3$, FIG. 6B is an SEM image of $5MgCaCO_3$, FIG. 6C is an SEM image of $10MgCaCO_3$, FIG. 6D is an SEM image of $15MgCaCO_3$, and FIG. 6E is an energy dispersive X-ray spectrum (EDS) of $10MgCaCO_3$;

FIG. 7A is a low-resolution TEM image of $10MgCaCO_3$, FIG. 7B is a high-resolution TEM image of $10MgCaCO_3$, and FIG. 7C is a selected area electron diffraction image of $10MgCaCO_3$;

FIG. 8A is a BET adsorption isotherm of $10MgCaCO_3$, and FIG. 8B is a graph of the pore size distribution in $10MgCaCO_3$;

FIG. 9A depicts the full spectrum of the material, FIG. 9B depicts a close-up of the Mg1s signal, FIG. 9C depicts a close-up of the O1s signal, FIG. 9D depicts a close-up of the Ca2p signal, and FIG. 9E depicts a close-up of the C1s signal;

FIG. 10A depicts the entire temperature range from ~25° C. to ~1000° C., and FIG. 10B depicts a close-up of the temperature range from ~400° C. to ~600° C.;

FIG. 11A is for PEG-6000, FIG. 11B is for PEG-6000/$5MgCaCO_3$, FIG. 11C is for PEG-6000/$10MgCaCO_3$, and FIG. 11D is for PEG-6000/$15MgCaCO_3$;

DETAILED DESCRIPTION OF THE EMBODIMENTS

Figure 1A:
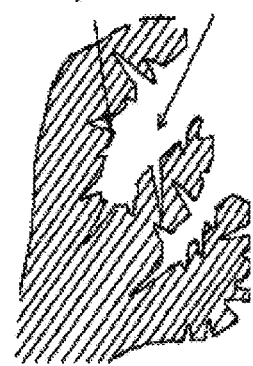
FIGS. 1A-1B are depictions of two possible pore structures of the hierarchically porous carbonate matrices, where

Embodiments of the present disclosure will now be described more fully hereinafter with reference to the accompanying drawings, in which some, but not all embodiments of the disclosure are shown.

The present disclosure will be better understood with reference to the following definitions. As used herein, the words "a" and "an" and the like carry the meaning of "one or more." Within the description of this disclosure, where a numerical limit or range is stated, the endpoints are included unless stated otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the words "about," "approximately," or "substantially similar" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), +/−15% of the stated value (or range of values), or +/−20% of the stated value (or range of values). Within the description of this disclosure, where a numerical limit or range is stated, the endpoints are included unless stated otherwise. Also, all values and subranges within a numerical limit or range are specifically included as if explicitly written out.

As used herein, "compound" is intended to refer to a chemical entity, whether as a solid, liquid, or gas, and whether in a crude mixture or isolated and purified.

As used herein, "composite" refers to a combination of two or more distinct constituent materials into one. The individual components, on an atomic level, remain separate and distinct within the finished structure. The materials may have different physical or chemical properties, that when combined, produce a material with characteristics different from the original components. In some embodiments, a composite may have at least two constituent materials that comprise the same empirical formula but are distinguished by different densities, crystal phases, or a lack of a crystal phase (i.e. an amorphous phase).

As used herein, hierarchical pore structure means that there are at least two different types of pore sizes present (e.g. mesopores and macropores), and that the different types of pore sizes present are connected to each other.

The present disclosure is intended to include all hydration states of a given compound or formula, unless otherwise noted or when heating a material. For example, magnesium nitrate or $Mg(NO_3)_2$ includes anhydrous $Mg(NO_3)_2$, $Mg(NO_3)_2 \cdot 6H_2O$, and any other hydrated forms or mixtures.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium. Isotopes of carbon include $^{13}$C and $^{14}$C. Isotopes of nitrogen include $^{14}$N and $^{15}$N. Isotopes of oxygen include $^{16}$O, $^{17}$O, and $^{18}$O. Isotopes of magnesium include $^{24}$Mg, $^{25}$Mg, and $^{26}$Mg. Isotopically-labeled compounds of the disclosure may generally be prepared by conventional techniques known to those skilled in the art or by processes analogous to those described herein, using an appropriate isotopically-labeled reagent in place of the non-labeled reagent otherwise employed.

According to a first aspect, the present disclosure relates to a composite phase-change material. The composite phase-change material comprises a carbonate matrix of the formula $Ca_{1-x}Mg_xCO_3$ where x=0.01 to 0.25, preferably 0.025 to 0.2, preferably 0.05 to 0.175, preferably 0.075 to 0.15, preferably 0.09 to 0.125. In preferred embodiments, the carbonate matrix is crystalline. In some embodiments, the carbonate matrix has the calcite structure type. In some embodiments, the carbonate matrix is in the form of nanoparticles. The crystallinity of the nanoparticles may be confirmed by techniques such as powder X-ray diffraction (PXRD), electron diffraction, high-resolution transmission electron microscopy, or another technique known to one of ordinary skill in the art. In some embodiments, the crystallinity is confirmed by powder X-ray diffraction. In some embodiments, the nanoparticles have a mean size of 400 to 700 nm, preferably 425 to 675 nm, preferably 450 to 650 nm, preferably 475 to 625 nm, preferably 500 to 600 nm. In some embodiments, the nanoparticles may have a spherical shape, or may be shaped like cylinders, boxes, blocks, spikes, flakes, plates, ellipsoids, toroids, stars, ribbons, discs, rods, granules, prisms, cones, platelets, sheets, angular chunks, terraced cubes, terraced rectangular prisms, or some other shape. In some embodiments, the nanoparticles may be substantially spherical, meaning that the distance from the nanoparticle centroid (center of mass) to anywhere on the nanoparticle outer surface varies by less than 30%, preferably by less than 20%, more preferably by less than 10% of the average distance. In some embodiments, the nanoparticles are in the form of blocks, granules, terraced rectangular prisms, or angular chunks, having a mean size in a range as previously described and having a largest dimension that is 50 to 500%, preferably 75 to 400, preferably 100 to 350%, preferably 150 to 250% of the range previously described and a smallest dimension that is 5 to 150, preferably 10 to 125, preferably 15 to 100, preferably 25 to 75% of the range previously described. In some embodiments, the nanoparticles may be in the form of agglomerates. As used herein, the term "agglomerates" refers to a clustered particulate composition comprising primary particles, the primary particles being aggregated together in such a way so as to form clusters thereof, at least 50 volume percent of the clusters having a mean size that is at least 2 times the mean size of the primary particles, and preferably at least 90 volume percent of the clusters having a mean size that is at least 5 times the mean diameter of the primary particles. The primary particles may be the nanoparticles having a mean size as previously described. In some embodiments, the nanoparticles are monodisperse, having a coefficient of variation or relative standard deviation, expressed as a percentage and defined as the ratio of the nanoparticle size standard deviation (σ) to the nanoparticle size mean (μ), multiplied by 100%, of less than 25%, preferably less than 10%, preferably less than 8%, preferably less than 6%, preferably less than 5%. In a preferred embodiment, the nanoparticles are monodisperse, having a nanoparticle size distribution ranging from 80% of the average particle size to 120% of the average nanoparticle size, preferably 85 to 115%, preferably 90 to 110% of the average particle size. In another embodiment, the nanoparticles are not monodisperse.

Figure 1B:
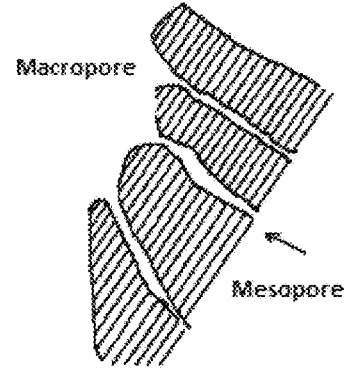

The carbonate matrix also has a hierarchical pore structure of mesopores and macropores. This hierarchical pore structure may take the form of a dendritic network of pores, beginning from a primary pore that is a macropore or mesopore, and branching to secondary, tertiary, or further pores that may be macropores or mesopores and decreasing in pore size as the branching progresses (FIG. 1A). Alternatively, this hierarchical pore structure may take the form of an interconnected pore network comprising primary pores that are macropores that are connected by mesopores (FIG. 1B). In this interconnected network, each mesopore is necessarily connected to at least one macropore or an exterior surface of a particle of the carbonate matrix. In some embodiments, the hierarchical pore structure of mesopores and macropores further comprises micropores.

In some embodiments, the macropores have a macropore modal size of 60 to 100 nm, preferably 62 to 98 nm, preferably 64 to 96 nm, preferably 66 to 94 nm, preferably 68 to 92 nm, preferably 70 to 90 nm, preferably 72 to 88 nm, preferably 74 to 86 nm. In some embodiments, the mesopores have a mesopore modal size of 2 to 20 nm, preferably 3 to 19 nm, preferably 4 to 18 nm, preferably 5 to 17 nm, preferably 6 to 16 nm. In some embodiments, the mesopores have a bimodal distribution of mesopore pore sizes with both modes falling between 2 and 20 nm, with a first mode of mesopore pore sizes of 2 to 10 nm, preferably 2.5 to 9 nm, preferably 3 to 8 nm, and a second mode of mesopore pore sizes of 11 to 20 nm, preferably 12 to 19 nm, preferably 13 to 18 nm, preferably 14 to 17 nm. In some embodiments, the first mode is predominant. In some embodiments, the macropore modal size is predominant over the mesopore modal size. In some embodiments, the macropore modal size is predominant over both the first mode of mesopore pore sizes and the second mode of mesopore pores sizes. In some embodiments, the carbonate matrix has a pore volume of 0.025 to 0.045 $cm^3g^{-1}$, preferably 0.0275 to 0.0425 $cm^3g^{-1}$, preferably 0.03 to 0.04 $cm^3g^{-1}$, preferably 0.0325 to 0.0375 $cm^3g^{-1}$. In some embodiments, the carbonate matrix has an open-cell structure. Solid porous materials can be closed-cell or open-cell. In closed-cell material, the pores form discrete pockets, i.e. cells, each completely surrounded by the solid material. In open-cell porous materials, the pores (cells) connect to each other, and fluid paths usually exist from one side of the porous material to the other side. Thus, open-cell porous materials may be used to filter or absorb fluids. In some embodiments, the carbonate matrix has a substantially open-cell structure, where less than 15 vol %, preferably less than 10 vol % of the total pore volume is confined within closed cells. In some embodiments, the carbonate matrix may comprise 1 to 20%, more preferably 2 to 16%, or 3 to 15% closed cells, relative to a total number of closed cells and open cells.

In some embodiments, the carbonate matrix has a surface area of 7.5 to 12.5 $m^2/g$, preferably 8 to 12 $m^2/g$, preferably 8.5 to 11.5 $m^2/g$, preferably 9 to 11 $m^2/g$, preferably 9.25 to 10.5 $m^2/g$. In some embodiments, the surface area described here is a BET surface area. In some embodiments, the carbonate matrix has a type IV BET adsorption and desorption isotherm. In some embodiments, the carbonate matrix BET adsorption and desorption isotherm has a H3 hysteresis loop.

In some embodiments, the carbonate matrix is present in an amount of 15 to 40 wt % based on a total weight of the composite phase-change material.

The composite phase-change material also comprises an organic phase-change substance. In some embodiments, the organic phase-change substance is present in an amount of 60 to 80 wt %, preferably 62 to 78 wt %, preferably 64 to 76 wt %, preferably 66 to 74 wt %, preferably 68 to 72 wt % based on a total weight of the composite phase-change material. In some embodiments, the composite phase-change material consists essentially of the carbonate matrix and the organic phase-change substance. While other materials may be present, preferably they are not. Examples of such other materials include, but are not limited to, air or other gases trapped in pores that are not accessible from an exterior surface of the carbonate matrix, water, calcium nitrate, magnesium nitrate, calcium hydroxide, magnesium hydroxide, and calcium magnesium hydroxide of the formula $Ca_{1-x}Mg_x(OH)_2$ where $0.01 \leq x \leq 0.99$. When present, these other materials are present in an amount less than 5 wt %, preferably less than 4 wt %, preferably less than 3 wt %, preferably less than 2 wt %, preferably less than 1 wt % based on a total weight of the composite phase-change material. In preferred embodiments, the composite phase-change material is devoid of materials other than the organic phase-change substance and the carbonate matrix.

Phase-change substances are suitable for storing heat energy in the form of latent heat. Phase-change substances are understood to be materials that undergo a phase transition when heat is supplied or removed, e.g. a transition from the solid to the liquid phase (melting) or from the liquid to the solid phase (solidification) or a transition between a low-temperature and high-temperature modification. If heat is supplied to or removed from a phase-change substance, its temperature on reaching the phase transition point remains approximately constant until the substance is completely transformed. The heat supplied or removed during the phase transition, which causes no temperature change in the substance, is known as latent heat. Thus, the composite phase-change material described herein may also be considered a latent heat storage material.

In some embodiments, the organic phase-change substance is an organic compound comprising carbon, hydrogen, and optionally oxygen and nitrogen. In another embodiment, the organic phase-change material is an organic compound substantially free of metals and metal ions, for instance, comprising less than 0.1 wt %, less than 0.01 wt %, or about 0 wt % metals and metal ions.

In some embodiments, the organic compound is at least one selected from the group consisting of a polyether, a polyolefin, a polyamide, a polycarbonate, a polyester, a petroleum wax, an animal-derived wax, a plant-derived wax, a fatty acid or fatty acid ester, and a sugar alcohol. Examples of polyethers include polyethylene glycol, polypropylene glycol, polybutylene glycol, polydioxanone, poly(p-phenylene ether), polyoxymethylene, and polyphenyl ether. Examples of polyolefins include polyethylene, polypropylene, polystyrene, poly(butadiene), poly(isoprene), and poly (vinyl chloride). Examples of polyamides include nylons such as nylon 4, nylon 6, nylon 11, nylon 46, and nylon 66, polyphthalamides such as poly(TPA/hexamethylenediamine) and poly (TPA/methylpentanediamine), polyurea, and poly(amino acids) such as poly(aspartic acid), poly (glutamic acid), polylysine, and polyalanine. Examples of polycarbonates include polypropylene carbonate, allyl diglycol carbonate, and poly(bisphenol A carbonate). Examples of polyesters include polyethylene terephthalate, polylactic acid, polybutyrate, polycaprolactone, polybutylene succinate, and polyglocolide. Examples of petroleum waxes include paraffin, ozokerite, ceresin, and zietrisikite. Examples of animal-derived waxes include beeswax, spermaceti, and lanolin. Examples of plant-derived waxes include bayberry wax, candelilla wax, carnauba wax, castor wax, jojoba wax, rice bran wax, sugarcane wax. Examples of fatty acids include caprylic acid, hexanoic acid, decanoic acid, myristic acid, stearic acid, cerotic acid, elaidic acid, lauric acid, linoleic acid, linolenic acid, mead acid, oleic acid, pinolenic acid, and valeric acid. Fatty acid esters are esters formed from fatty acids. Examples of sugar alcohols include, but are not limited to, ethylene glycol, glycerol, erythritol, threitol, arabitol, xylitol, ribitol, mannitol, sorbitol, galactitol, fucitol, iditol, inositol, volemitol, isomalt, maltitol, lactitol, maltotriitol, maltotetraitol, and polyglycitol. In other embodiments, the organic compound may be a polysaccharide, oligosaccharide, starch, glycogen, pectin, or cellulose.

In some embodiments, the organic phase-change substance may comprise two or more organic compounds. For instance, the phase change material may comprise two organic compounds at a mass ratio in a range of 1:10 to 10:1, preferably 1:5 to 5:1, more preferably 1:2 to 2:1, or about 1:1. In another embodiment, the phase change material may comprise two polymers having the same monomeric units but having different molecular weights, for instance polyethylene glycol having a weight average molecular weight of about 4,000 Da, and polyethylene glycol having a weight average molecular weight of about 6,000 Da. In preferred embodiments, the organic phase-change substance has a differential scanning calorimetry (DSC) plot with a single signal for melting and a single signal for solidifying. In preferred embodiments, an organic phase-change substance which comprises two or more organic compounds does not phase separate after either melting or solidifying.

In some embodiments, the organic phase-change substance is a polyether having an enthalpy of fusion of 93 to 207 J/g, preferably 125 to 205 J/g, preferably 175 to 202.5 J/g, preferably 190 to 202 J/g. Here, the enthalpy of fusion may be of a bulk organic phase-change substance located outside of the carbonate matrix or of the organic phase-change substance located within the pores. In a preferred embodiment, the enthalpy of fusion described above is of the bulk organic phase-change substance located outside of the carbonate matrix.

In preferred embodiments, the organic phase-change substance is polyethylene glycol having a weight average molecular weight in the range of 4,000 to 8,000 Da, preferably 4,500 to 7,500 Da, preferably 5,000 to 7,000 Da, preferably 5,500 to 6,500 Da, preferably 6,000 Da.

In some embodiments, the organic phase-change substance has a melting temperature of 55 to 64° C., preferably 47 to 62° C., preferably 49 to 60° C., preferably 51 to 58° C., preferably 53 to 56° C. Here, the melting temperature may be of a bulk organic phase-change substance located outside of the carbonate matrix or of the organic phase-change substance located within the pores. In a preferred embodiment, the melting temperature described above is of the organic phase-change substance located within the pores of the carbonate matrix. In some embodiments, the organic phase-change substance has a solidifying temperature of 27 to 45° C., preferably 29 to 43° C., preferably 31 to 41° C., preferably 33 to 39° C., or about 35 to 37° C. Here, the solidifying temperature may be of a bulk organic phase-change substance located outside of the carbonate matrix or of the organic phase-change substance located within the pores. In a preferred embodiment, the solidifying temperature described above is of the organic phase-change substance located within the pores of the carbonate matrix. In some embodiments, the organic phase-change substance has a melting temperature that is 16.5 to 21.34° C., preferably 17 to 20° C., preferably 18 to 19° C. different from its solidifying temperature. Here, the melting temperature and solidifying temperature may be of a bulk organic phase-change substance located outside of the carbonate matrix or of the organic phase-change substance located within the pores. In a preferred embodiment, the melting temperature and solidifying temperature described above is of the organic phase-change substance located within the pores of the carbonate matrix.

In some embodiments, of the total weight of the organic phase-change substance, 10 to 100 wt %, preferably 50 to 99.9 wt %, preferably 60 to 99.8 wt %, preferably 70 to 99.7 wt % is located within the pores of the carbonate matrix. In some embodiments, 80 to 100 vol %, preferably 82 to 99.9 wt %, preferably 85 to 99.8 wt %, preferably 90 to 99.7 wt % of a total pore volume of the carbonate matrix is occupied by the organic phase-change substance. In a related embodiment, 80 to 100 vol %, preferably 82 to 99.9 wt %, preferably 85 to 99.8 wt %, preferably 90 to 99.7 wt % of a total pore volume that is in fluid communication with the surface of the carbonate matrix is occupied by the phase change material.

In some embodiments, less than 10 wt %, preferably less than 8 wt %, more preferably less than 5 wt %, even more preferably less than 3 wt %, or about 0 wt % of the organic phase-change substance located in the pores of the carbonate matrix, relative to a total weight of the organic phase-change substance located in the pores, exits the pores when the composite phase-change material undergoes a melting or a solidifying (freezing) transition. In a preferred embodiment, none of the organic phase-change substance within the pores exits the pores during single or multiple melting or solidifying transitions.

In some embodiments, the composite phase-change material has a latent heat of freezing of 107 to 201 J/g, preferably 116 to 162 J/g, preferably 130-140 J/g, preferably 132 to 136 J/g.

In some embodiments, the composite phase-change material has a latent heat of melting of 123 to 221 J/g, preferably 125 to 175 J/g, preferably 134 to 163 J/g, preferably 150 to 155 J/g.

In some embodiments, the composite phase-change material has a thermal conductivity of 0.220 to 0.45 $W \cdot m^{-1} \cdot K^{-1}$, preferably 0.2375 to 0.4 $W \cdot m^{-1} \cdot K^{-1}$, preferably 0.3 to 0.375 $W \cdot m^{-1} \cdot K^{-1}$, preferably 0.32 to 0.36 $W \cdot m^{-1} \cdot K^{-1}$, preferably 0.34 to 0.35 $W \cdot m^{-1} \cdot K^{-1}$. According to a second aspect, the present disclosure relates to a method for forming the composite phase-change material of the first aspect. This method involves hydrothermally reacting calcium nitrate, magnesium nitrate, and a carbonate base or bicarbonate base in water in a closed vessel. The combination of calcium nitrate, magnesium nitrate, carbonate base or bicarbonate base, and water may be considered a reaction mixture. In some embodiments, the reaction mixture may be enclosed within a plastic vessel within a stainless steel vessel.

In some embodiments, the calcium nitrate is present in the reaction mixture at a concentration of 5 to 600 mM, preferably 10 to 200 mM, preferably 15 to 100 mM. In some embodiments, the magnesium nitrate is present in the reaction mixture in an amount of 0.05 to 150 mM, preferably 0.1 to 50 mM, preferably 0.15 to 25 mM. In some embodiments the ratio of the amount of magnesium nitrate present in the reaction mixture to the total amount of calcium nitrate and magnesium nitrate present in the reaction mixture is 0.01 to 0.25, preferably 0.025 to 0.2, preferably 0.05 to 0.175, preferably 0.075 to 0.15, preferably 0.09 to 0.125. In preferred embodiments, the ratio of the amount of magnesium nitrate present in the reaction mixture to the total amount of calcium nitrate and magnesium nitrate present in the reaction mixture is the same as the ratio of magnesium present in the carbonate matrix to the total amount of calcium and magnesium present in the carbonate matrix. In preferred embodiments, the carbonate base or bicarbonate base is ammonium carbonate. In some embodiments, the reaction mixture consists of only calcium nitrate, magnesium nitrate, ammonium carbonate, and water. In alternative embodiments, the reaction mixture may comprise other basic compounds in addition to or in place of the ammonium carbonate, for example, an alkali metal carbonate or ammonium bicarbonate.

The water may be tap water, distilled water, bidistilled water, deionized water, deionized distilled water, reverse osmosis water, and/or some other water. In some embodiments the water is distilled or treated with reverse osmosis to eliminate trace metals. Preferably the water is deionized, deionized distilled, bidistilled, or reverse osmosis water, and at 25° C. has a conductivity of less than 10 $\mu S \cdot cm^{-1}$, preferably less than 1 $\mu S \cdot cm^{-1}$; a resistivity of greater than 0.1 $M\Omega \cdot cm$, preferably greater than 1 $M\Omega \cdot cm$, more preferably greater than 10 $M\Omega \cdot cm$; a total solid concentration of less than 5 mg/kg, preferably less than 1 mg/kg; and a total organic carbon concentration of less than 1000 µg/L, preferably less than 200 µg/L, more preferably less than 50 µg/L.

In preferred embodiments, the hydrothermally reacting consists essentially of forming the reaction mixture by mixing calcium nitrate and magnesium nitrate in water and adding the carbonate base or bicarbonate base until the pH is 7.5 to 9.5, preferably 8 to 9, preferably 8.25 to 8.75, preferably 8.4 to 8.6, preferably 8.5, followed by stirring for 1 to 3 hours, preferably 1.25 to 2.75 hours, preferably 1.5 to 2.5 hours, preferably 1.75 to 2.25 hours, preferably 2 hours, whereupon the reaction mixture is transferred to the closed vessel described above and heated to a temperature of 120 to 280° C., preferably 130 to 270° C., preferably 140 to 260° C., preferably 150 to 250° C., preferably 160 to 240° C., preferably 170 to 230° C., preferably 180 to 220° C., preferably 190 to 210° C., preferably 200° C. for 12 to 36 hours, preferably 16 to 32 hours, preferably 20 to 28 hours, preferably 22 to 26 hours, preferably 24 hours. In some embodiments, the closed vessel is allowed to cool to ambient temperature (i.e. 23 to 25 C) before opening. This hydrothermal reacting produces a precipitate. While other steps may be performed, such has ultrasonication of the reaction mixture before transfer to the closed vessel, heating the reaction mixture before transfer to the closed vessel, or cooling below ambient temperature before opening may be performed, preferably they are not.

In some embodiments, the precipitate is isolated by any solid-liquid separation technique known to those of ordinary skill in the art, for example, filtration, decantation, centrifugation, or the like, but excluding techniques such as evaporation. In some embodiments, the precipitate is washed. In some embodiments, the washing is performed with a wash solution. In some embodiments, the wash solution comprises water. In some embodiments, the aforementioned water is tap water, distilled water, bidistilled water, deionized water, deionized distilled water, reverse osmosis water, and/or some other water as described above. In some embodiments, the washing is performed with a first wash solution and a second wash solution. In preferred embodiments, the first wash solution comprises water as described above and the second wash solution comprises an organic alcohol having between 1 and 4 carbons, preferably between 2 and 3 carbons. In preferred embodiments, the second wash solution comprises ethanol. In some embodiments, the washing is performed by suspending the precipitate in the wash solution, followed by isolating the precipitate by any solid-liquid separation technique as described above. In some embodiments, the precipitate is washed from 2 to 10 times, preferably 3 to 8 times, preferably 4 to 7 times. In some embodiments, following a final wash, the precipitate is dried. In some embodiments, the drying takes place at a temperature of 100 to 150° C., preferably 110 to 140° C., preferably 115 to 130° C., preferably 120° C. for 12 to 36 hours, preferably 16 to 32 hours, preferably 20 to 28 hours, preferably 22 to 26 hours, preferably 24 hours to form the carbonate matrix.

Following the formation of the carbonate matrix, the carbonate matrix is mixed with a solution comprising the organic phase-change substance and an organic solvent to form an impregnation mixture. In some embodiments, the organic solvent comprises an organic alcohol having between 1 and 4 carbons, preferably between 2 and 3 carbons. In preferred embodiments, the organic solvent comprises ethanol. In preferred embodiments, the organic solvent comprises absolute ethanol. In some embodiments, the organic phase-change substance is present in the impregnation mixture at a concentration of 7.5 to 12.5 g/L, preferably 8 to 12 g/L, preferably 9 to 11 g/L, preferably 9.5 to 10.5 g/L, preferably 10 g/L. In some embodiments, the carbonate matrix is present in the impregnation mixture at a concentration of 3 to 5 g/L, preferably 3.25 to 4.75 g/L, preferably 3.5 to 4.5 g/L, preferably 3.75 to 4.25 g/L, preferably 4 g/L. In some embodiments, the mixing comprises stirring the carbonate matrix and the solution for 1 to 60 minutes, preferably 10 to 50 minutes, preferably 15 to 45 minutes, preferably 20 to 40 minutes, preferably 30 minutes and ultrasonicating the carbonate matrix and solution for 1 to 60 minutes, preferably 10 to 50 minutes, preferably 15 to 45 minutes, preferably 20 to 40 minutes, preferably 30 minutes.

Following the mixing, the impregnation mixture is dried to form the composite phase-change material. In some embodiments, the drying comprises heating the impregnation mixture to 60 to 100° C., preferably 65 to 95° C., preferably 70 to 90° C., preferably 75 to 85° C., preferably 80° C. for 12 to 36 hours, preferably 16 to 32 hours, preferably 20 to 28 hours, preferably 22 to 26 hours, preferably 24 hours to form the composite phase-change material.

According to a third aspect, the present disclosure relates to a building material comprising the composite phase-change material of the first aspect. The building material may be a brick, a tile, a siding, a shingle, a beam, an insulation, a duct, a post, or some other building material. The building material may form part of a window shade, a roof, a wall, a floor, a foundation, an HVAC unit, or a storage tank. The building material may comprise the composite phase-change material at weight percentage in a range of 0.01 to 99 wt %, preferably 0.1 to 90 wt %, preferably 5 to 80 wt %, preferably 10 to 75 wt % relative to a total weight of the building material.

The examples below are intended to further illustrate protocols for preparing, characterizing the composite phase-change material, and uses thereof, and are not intended to limit the scope of the claims.

EXAMPLES

Materials

Polyethylene glycol with an average molecular weight of MW 6000 was purchased from BDH Chemicals. Calcium nitrate salt $Ca(NO_3)_2.9H_2O$, magnesium nitrate hexahydrate $(Mg(NO_3)_2.6H_2O)$, and ethanol were also purchased from BDH Chemicals. $(NH_4)_2CO_3$ was purchased from Sigma-Aldrich.

Hydrothermal Method

Appropriate amounts of $Ca(NO_3)_2.9H_2O$ and $Mg(NO_3)_2.6H_2O$ were dissolved in deionized water and the pH was adjusted to 8.5 using 15% $(NH_4)_2CO_3$ (4.1 mol cm$^{-3}$). The precursor suspension was stirred for approximately 2 h and then poured into a Teflon bottle with a volume of 25 cm$^3$, supported by a stainless-steel vessel. The vessel was sealed, and the hydrothermal reaction was performed at a temperature of 200° C. for 24 h using a 500 mL autoclave with a magnetic stirrer (Model TPR-1, Taiatsu Techno). The contents were filtered after allowing to cool to room temperature to obtain the final product. The product was then washed using several cycles of centrifugation/decantation in deionized water and ethanol to remove residual anions and dried in an oven for 24 h at 120° C. Three compositions of $Mg^{2+}$-doped $CaCO_3$ were used in this study. They are 5 mol % $Mg^{2+}$-doped $CaCO_3$ (5MgCaCO$_3$), 10 mol % $Mg^{2+}$-doped $CaCO_3$ (10MgCaCO$_3$), and 15 mol % $Mg^{2+}$-doped $CaCO_3$ (15MgCaCO$_3$).

Preparation of the Shape-Stabilized Composite PCM

The PCM composites were prepared by dissolving PEG-6000 (0.5 g) in absolute ethanol (50 mL), and then adding 0.2 g of mesoporous $MgCaCO_3$ (product obtained with 5, 10, and 15 mol % $Mg^{2+}$) to the solution followed by stirring for 30 min. The solution was then transferred into an ultrasonic sonication machine and left for another 30 min for further dissolution. The solution was allowed to stand for 24 h at 80° C. to remove the ethanol by evaporation. Meanwhile, the solution was kept stirring. Finally, PEG/5MgCaCO$_3$, PEG/10MgCaCO$_3$, and PEG/15MgCaCO$_3$ composite PCMs were obtained and further characterized.

Characterization

The X-ray diffraction (XRD) patterns were recorded using a powder X-ray diffractometer (Rigaku Miniflex with a variable slit width) with graphite monochromatized Cu-Kα radiation, operated at 30 kV and 15 mA. A Perkin Elmer (16F PC) spectrometer was used to obtain the FTIR spectra. The electron microscopic images were obtained using a JEOL JSM-6400F field emission scanning electron microscope at an acceleration voltage of 20 kV. Energy dispersive X-ray spectra (EDS) were recorded using a Lyra3 TESCAN FE-SEM equipped with an Xmass detector, Oxford Instruments. Transmission electron microscopy (TEM) images were obtained using a transmission electron microscope (JEOL, JEM 2011) with a 94 k CCD camera (Ultra Scan 400SP, Gatan) operated at 200 kV. The specific surface area was determined using the Brunauer-Emmett-Teller (BET) method, and the pore volume, and pore diameter of the samples were determined using the Barrett-Joyner-Halenda (BJH) method, from the adsorption isotherms of $N_2$ obtained at 77 K with a NOVA-1200 apparatus. An X-ray photoelectron spectrometer (XPS) equipped with an Al-Kα microfocusing X-ray (1486.6 eV) monochromator (ESCALAB 250Xi XPS Microprobe, Thermo Scientific, USA) was used to determine the chemical structure and composition of the mesoporous 10MgCaCO$_3$ and 15MgCaCO$_3$. The resolution of the instrument was 0.5 eV. The chemical composition of the films (prepared using a slurry of 10MgCaCO$_3$ and 15MgCaCO$_3$ in ethanol deposited on a glass substrate) were determined using XPS. During the XPS characterization, the specimen chamber was at ambient temperature and a pressure of 5×10$^{-10}$ mbar. The spectra were referenced to the adventitious C is peak at 284.5 eV. As the films deposited on glass substrates were used in the XPS analysis, an electron flood gun was used to overcome charging effects for the non-conducting samples. XPS measurements were performed 30 seconds before and after ion etching to verify the presence of carbon. Etching was performed using a 2 keV Ar$^+$ ion beam on a 1 mm$^2$ area of the surface, while the ion current at the sample surface was less than 1 μA. Thermogravimetric analysis (TGA) of approximately 10 mg samples was conducted using a Shimadzu TA-50 thermal analyzer at a heating rate of 10° C./min from room temperature to 600° C. under dry nitrogen. The phase change temperature and the latent heat of the samples were determined using a differential scanning calorimeter (DSC, Q2000). DSC measurements were conducted by heating 10 mg samples sealed in an aluminum pan at a heating rate of 5° C./min under a constant stream of argon at a flow rate of 20 mL/min.

Results and Discussion

XRD Characterization

Figure 2A:
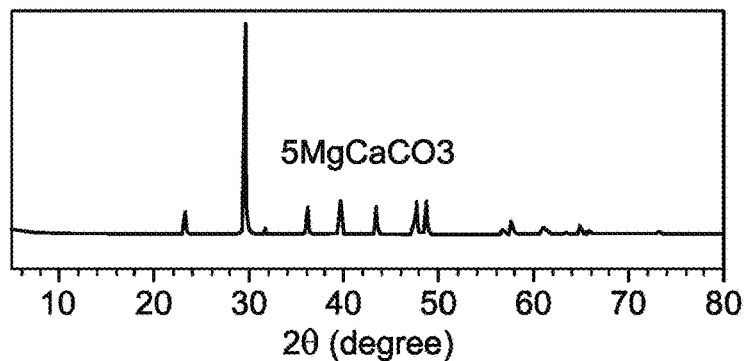
FIGS. 2A-2C are PXRD patterns of the carbonate matrices, where
Figure 2B:
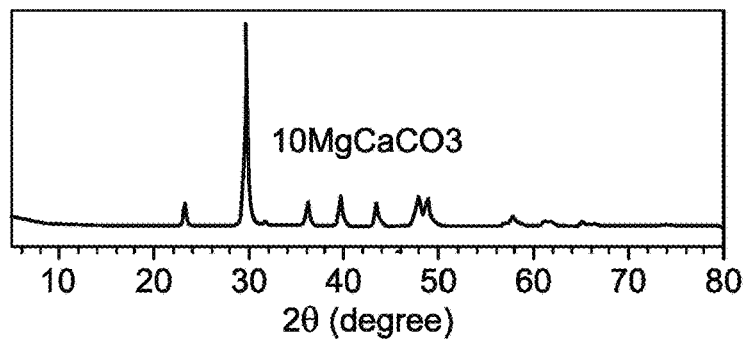
Figure 2C:
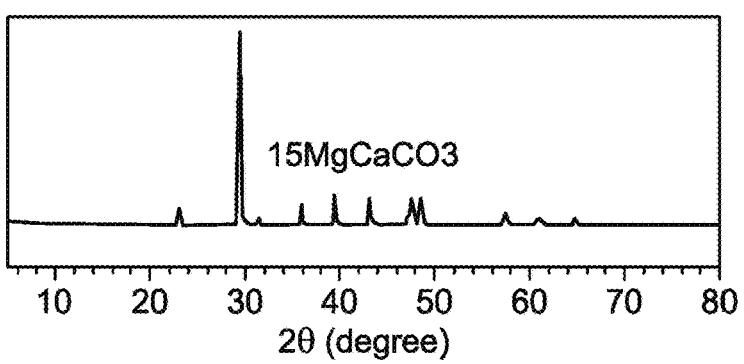

The XRD patterns of the matrices are presented in FIG. 2A-2C, with 5MgCaCO$_3$ shown in FIG. 2A, 10MgCaCO$_3$ shown in FIG. 2B, and 15MgCaCO$_3$ shown in FIG. 2C. All the XRD patterns of as-synthesized powders after hydrothermal treatment at 200° C. for 24 h indicate that the samples are pure calcite structure. The 10MgCaCO$_3$ sample has diffraction peaks at 2θ of 23.1, 29.59, 39.55, 47.9, 48.77, and 57.74, which are assigned to calcite planes (012), (104), (113), (018), (116), and (122). These peaks are in good agreement with those provided for the crystal form of CaCO$_3$ in the standard JCPDS file No. 25-0127 [Yu S, et. al., Energy & Fuels, 2014, 28, 5, 3519-3529]. However, the peaks of 10MgCaCO$_3$ sample are shifted. The shift is more pronounced for peaks corresponding to planes (104), (113) and (116), which is evidence for smaller cations, Mg$^{2+}$ in this case, replacing Ca$^{2+}$ cations [Tomić Z, et. al., Journal of Raman Spectroscopy, 2009, 41, 5, 582-586]. The other matrices follow the same pattern as 10MgCaCO$_3$.

CaCO$_3$ and MgCO$_3$ reportedly have the same structure as MnCO$_3$, FeCO$_3$, and (Mn,Fe)CO$_3$. However, the substitution of Ca$^{2+}$ for Mg$^{2+}$ in MgCO$_3$, or Mg$^{2+}$ for Ca$^{2+}$ in CaCO$_3$, produces an ordered CaMg(CO$_3$)$_2$ structure that accommodates the difference between the ionic radii of Ca$^{2+}$ (r=1.14 Å) and Mg$^{2+}$ (r=0.86 Å) [Kelleher I J, et. al., Molecular Simulation, 2002, 28, 6-7, 557-572]. According to Barabas et al., the CaCO$_3$ samples formed at lower concentration of Mg has almost pure calcite structure, and the increase in Mg/Ca ratio to more than 1 causes the crystal lattice to change from calcite to aragonite structure [Barabas M, et. al., International Journal of Radiation Applications and Instrumentation, Part A: Applied Radiation and Isotopes, 1989, 40, 10-12, 1105-1111]. Here, the ratio of Mg/Ca is well below 1. Therefore, the results here match and support the conclusion that the material has the calcite structure type with a slightly different sized unit cell from the inclusion of smaller Mg$^{2+}$ ions. Furthermore, Rodriguez-Blanco et al. also found that the stability of amorphous calcium carbonate (ACC) increases with the presence of Mg, which favors the direct transformation of ACC to calcite and inhibits crystallization of vaterite [R-Blanco J, et. al., J Alloys and Compounds, 2012, 536].

Figure 3A:
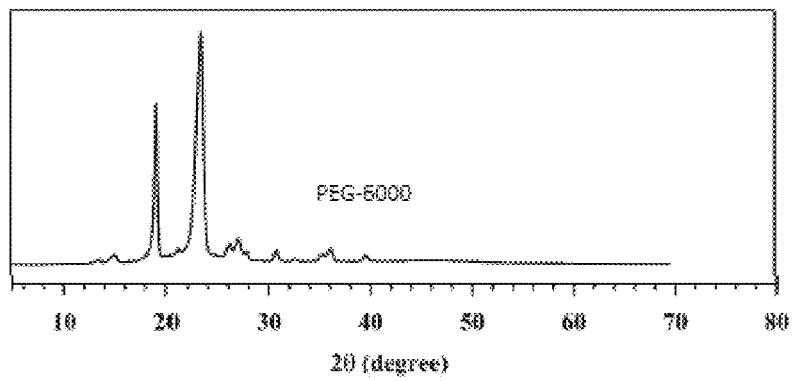
FIGS. 3A-3D are PXRD patterns for the organic phase-change substance and the composite phase-change materials, where
Figure 3B:
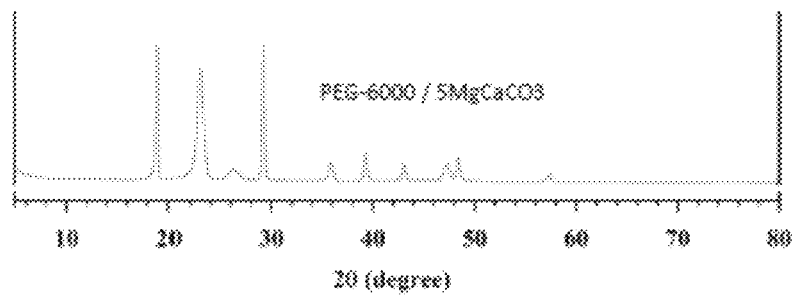
Figure 3C:
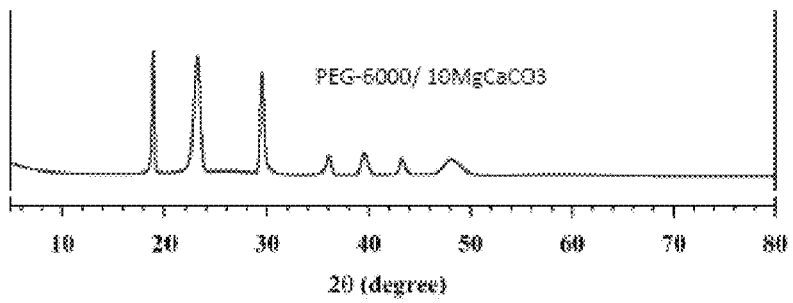
Figure 3D:
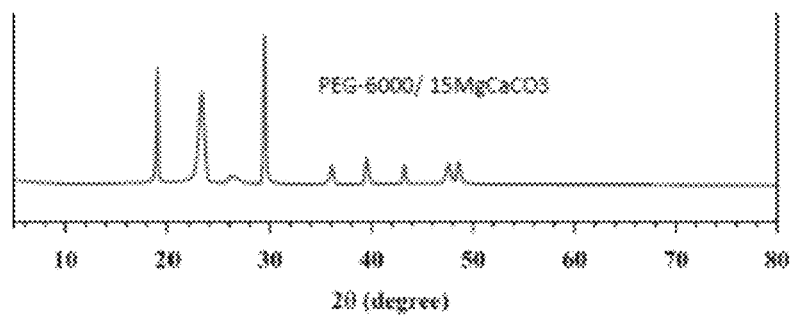

The XRD pattern of pure PEG-6000 is shown in FIG. 3A. For comparison purposes, the XRD patterns of the three composites of PEG/5MgCaCO$_3$ (FIG. 3B), PEG/10MgCaCO$_3$ (FIG. 3C) and PEG/15MgCaCO$_3$ (FIG. 3D) are also included. All the composites show the same XRD pattern. The peaks appearing in the 2θ range of 15°-30° are similar to the diffraction peaks of crystalline PEG. Intense sharp peaks are present at 2θ of nearly 19.24° and 23.42° in the XRD patterns of all composites, indicating the presence of crystalline PEG [Cheng L, et. al., Inter J Pharmaceutics, 2010, 387, 1-2, 129-138]. The XRD patterns of PEG/5MgCaCO$_3$ (FIG. 3B), PEG/10MgCaCO$_3$ (FIG. 3C), and PEG/15MgCaCO$_3$ (FIG. 3D) indicate that PEG and CaCO$_3$ exist as a physical mixture and a chemical reaction between the two phases has not occurred. The height of the peaks of PEG/10MgCaCO$_3$ and PEG/15MgCaCO$_3$ is smaller than that of PEG alone, indicating that the pores of PEG/10MgCaCO$_3$ and PEG/15MgCaCO$_3$ are occupied by the melted PEG. The occupation of the pores of composites by the PEG melt decreases the crystallite size of PEG. The peaks in the XRD pattern of PEG/10MgCaCO$_3$ show the largest decrease of peak height among the three composites. This indicates that a larger portion of PEG is impregnated into the porous structure of 10MgCaCO$_3$.

FTIR Characterization

Figure 4A:
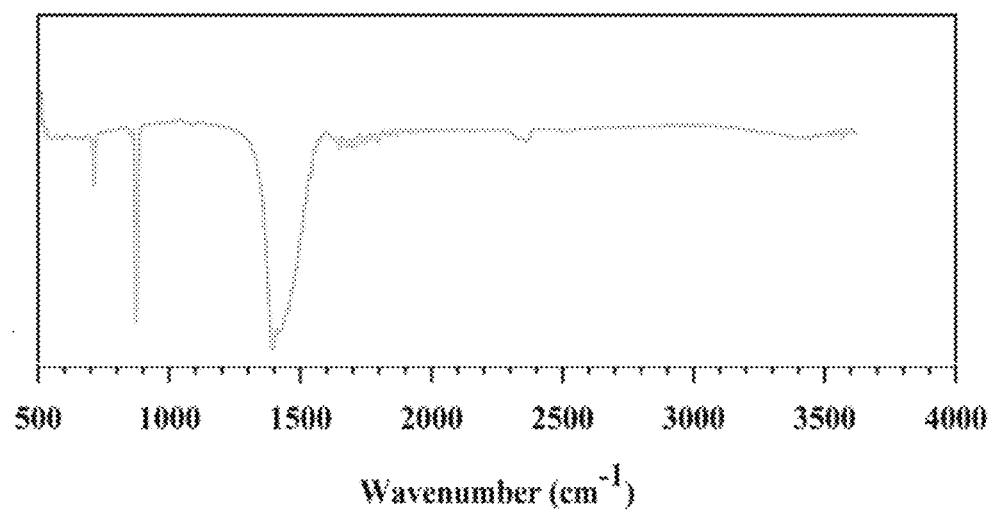
FIGS. 4A-4G are FTIR spectra of the synthesized carbonate matrices, organic phase-change substance, and the composite phase-change materials, where
Figure 4B:
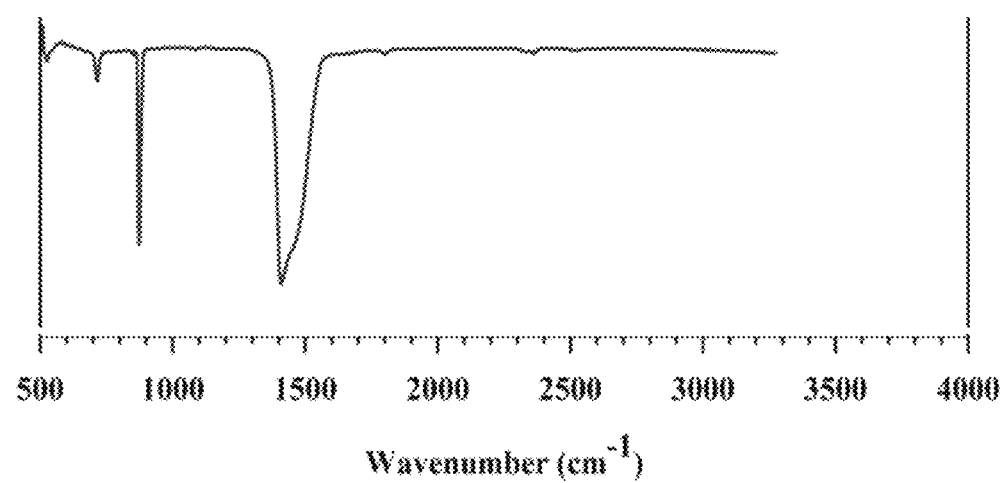
Figure 4C:
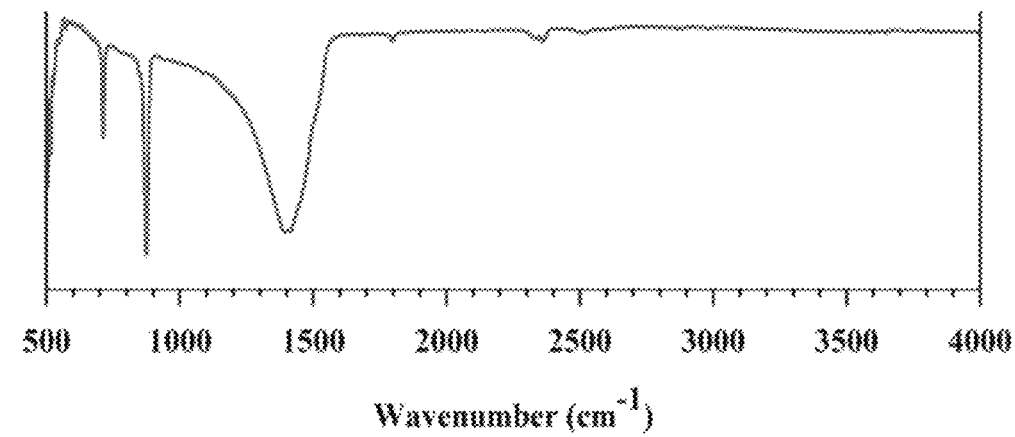
Figure 4D:
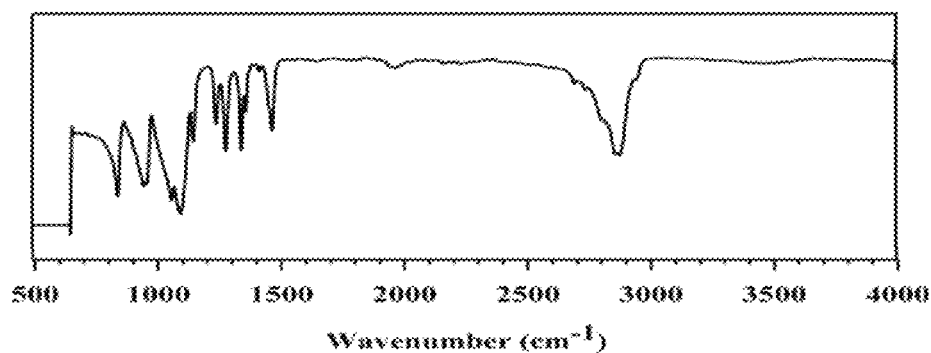
Figure 4E:
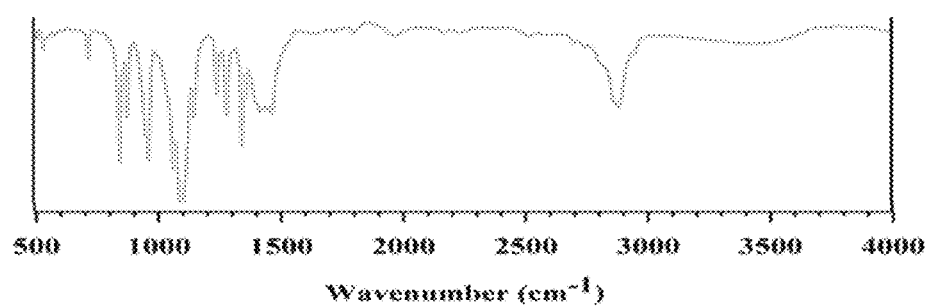
Figure 4F:
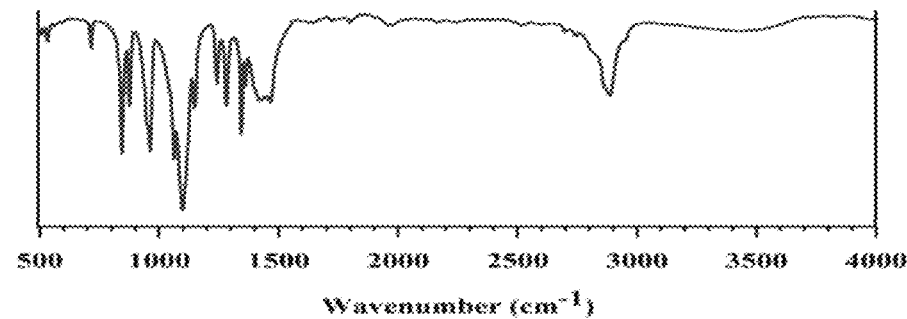
Figure 4G:
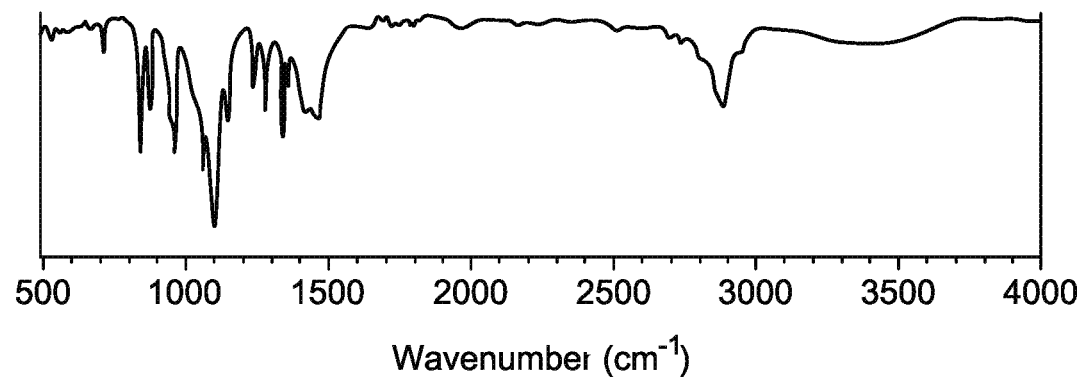

FTIR spectroscopy was used to characterize the supporting matrices, PEG, and the composites. FIG. 4A-4C show the FTIR patterns of 5MgCaCO$_3$ (FIG. 4A), 10MgCaCO$_3$ (FIG. 4B), and 15MgCaCO$_3$ (FIG. 4C). According to Gao [Gao Y, et. al., J Colloid and Interface Science, 2018, 512, 39-46], the FTIR bands at wave numbers of 711.6 cm$^{-1}$, 875.52 cm$^{-1}$, and 1463.23 cm$^{-1}$ are characteristic bands of calcite. FIG. 4A has an FTIR band at 713 cm$^{-1}$, which is attributed to O—C—O in-plane bending vibration of calcite. CO$_3^{2-}$ stretching vibration is attributed to the FTIR band at a wavenumber of 1463 cm$^{-1}$. The FTIR spectra of all three matrices have bands that match those published for calcite described above. The FTIR spectra together with the XRD patterns prove that the synthesized matrices are calcite. The absorption peak at wavenumber of 1109 cm$^{-1}$ in the FTIR spectrum of pure PEG shown in FIG. 4D is attributed to the stretching vibration of C—O—C [Karaman S, et. al., Solar Energy Mater & Cells, 2011, 95, 1647-1653]. The peak at 1095 cm$^{-1}$ is attributed to C—O—H, whereas the one at 1278 cm$^{-1}$ is attributed to OH [Zhang Z, et. al., J Phys Chem B, 2006, 110, 12969-73; and Cuiling G, et. al., Crystal Growth & Design, 2008, 8, 3786-90]. Moreover, the two peaks at wavenumbers 1339 cm$^{-1}$ and 1464 cm$^{-1}$ are due to bending vibrations of C—H. Furthermore, this spectrum has absorption bands at 2889 cm$^{-1}$ and 3468 cm$^{-1}$, which are attributed to the stretching vibrations of aliphatic C—H and OH, respectively. The spectra of the composites shown in FIGS. 4E-4G have peaks similar to those of pure PEG (FIG. 4D) The peak observed at wavenumber of 711.6 cm$^{-1}$ in FIGS. 4A-4C is also present in the spectral patterns of the composites shown in FIGS. 4E-4G, indicating that the supporting matrices remain unchanged. The strong peaks at 962 cm$^{-1}$ result from the stretching vibrations of the functional group —CH$_2$. The FTIR spectra of PEG/10MgCO$_3$ and PEG/15MgCO$_3$ depicted in FIGS. 4F and 4G show that peaks due to both CaCO$_3$ and PEG are present. Significant new peaks are not present, indicating that only physical mixing is present resulting in well-mixed CaCO$_3$ and PEG composites.

Raman Spectroscopy

Figure 5A:
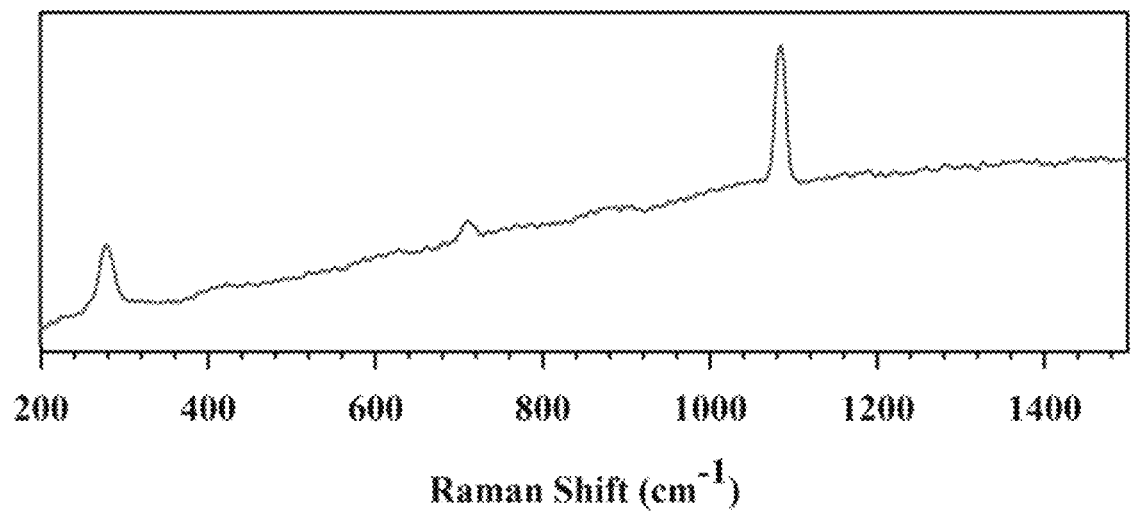
FIGS. 5A-5C are Raman spectra of the carbonate matrices, where
Figure 5B:
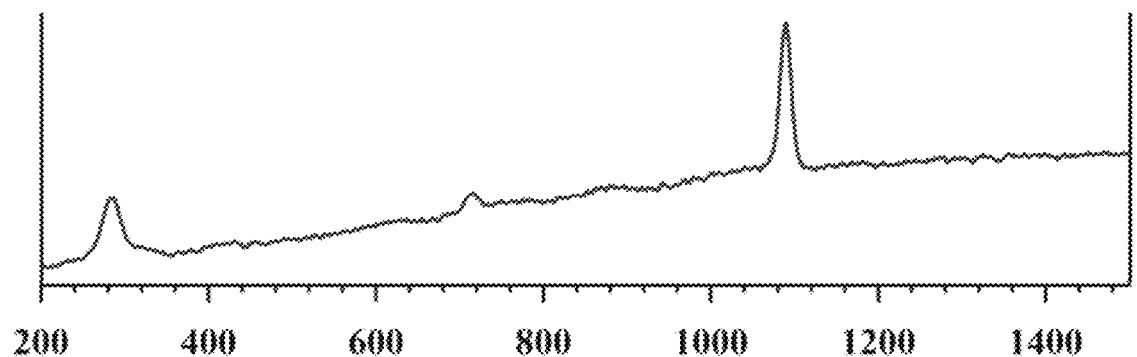
Figure 5C:
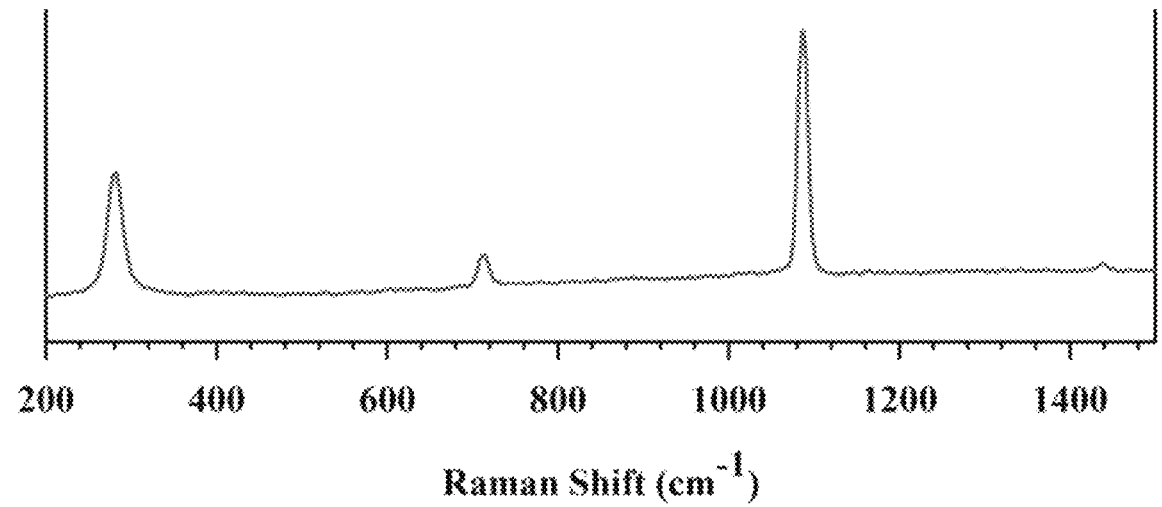

FIGS. 5A-5C shows the Raman spectra of 5MgCaCO$_3$ (FIG. 5A), 10MgCaCO$_3$ (FIG. 5B), and 15MgCaCO$_3$ (FIG. 5C). The symmetric stretch (v1) and in-plane bending vibration (v2) for carbonate ion vibrations are active in the Raman spectra for all three supporting matrices. For v1, it appears as a very strong Raman peak at a Raman shift between 1084 and 1089 cm$^{-1}$. The peak due to in-plane bending (v2) is at a Raman shift of 711 cm$^{-1}$. Moreover, the external vibrations of the CO$_3$ groups, including their translations are observed at bands around 285 cm$^{-1}$. All these bands are characteristic bands of calcite. In the Raman spectra of the three samples shown in FIGS. 5A-5C, the band due to the external vibrations of the CO$_3$ group is shifted to 284 cm$^{-1}$, 284 cm$^{-1}$, and 283 cm$^{-1}$ for 5MgCaCO$_3$, 10MgCaCO$_3$, and 15MgCaCO$_3$, respectively. The band due to in-plane bending (v2) is shifted to 711 cm$^{-1}$, 712 cm$^{-1}$, and 714 cm$^{-1}$ for 5MgCaCO$_3$, 10MgCaCO$_3$, and 15MgCaCO$_3$, respectively. This shift is attributed to the substitution of Ca$^{2+}$ by a smaller divalent cation, i.e. Mg$^{2+}$, which is a typical characteristic of the spectrum of Mg-calcite. This is evidence for the successful doping of Mg in calcite.

Figure 6A:
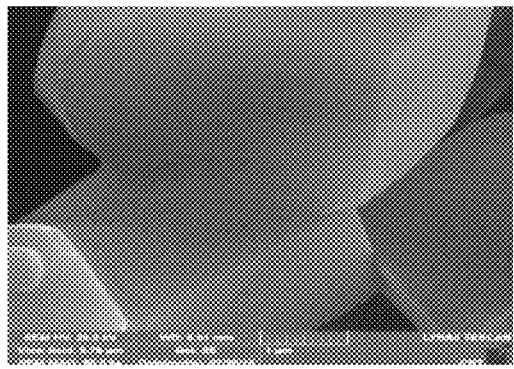
FIGS. 6A-6E are scanning electron microscopy (SEM) results, where
Figure 6B:
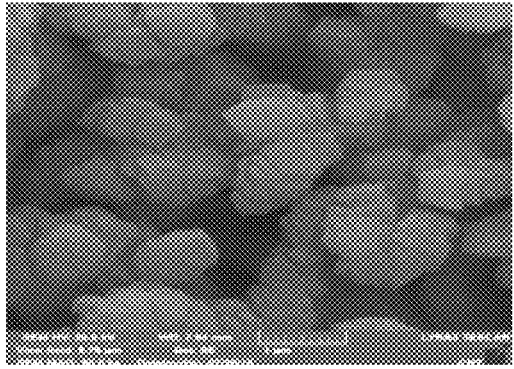
Figure 6C:
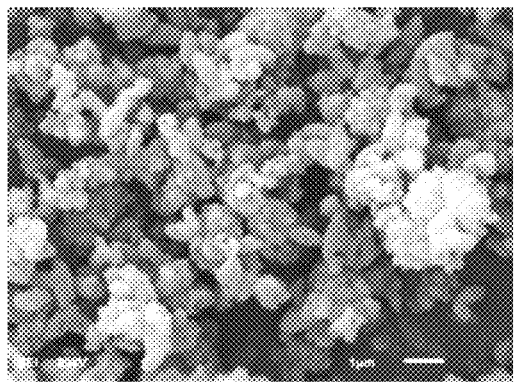
Figure 6D:
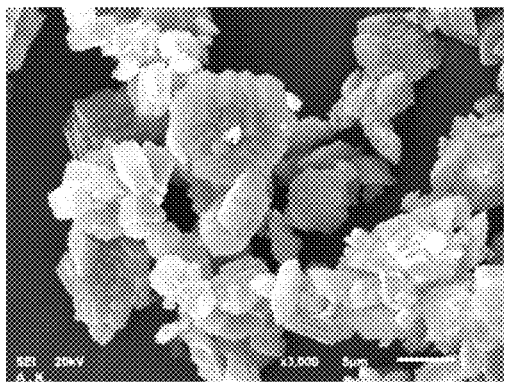
Figure 6E:
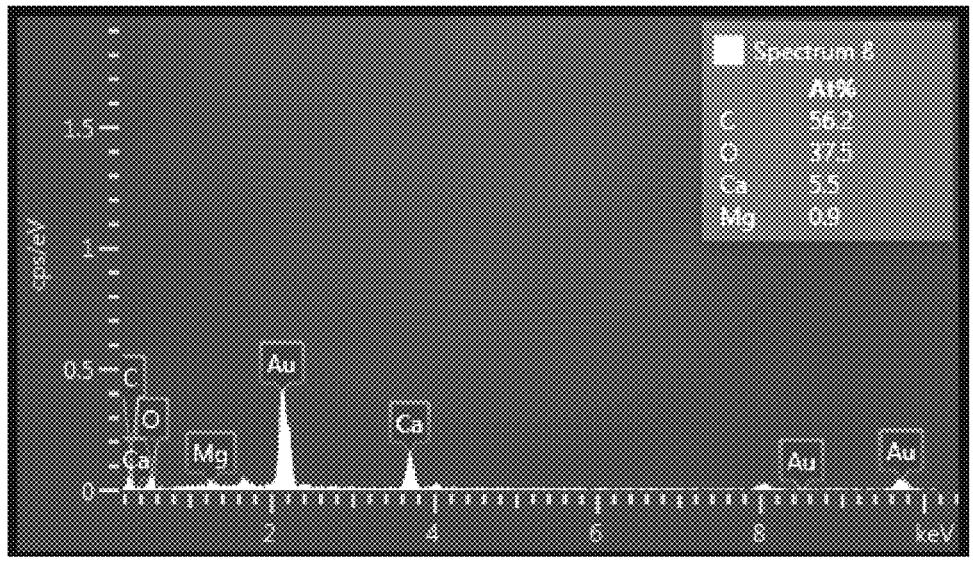

Field Emission Scanning Electron Microscopy FIGS. 6A-6E depict the FE-SEM images of as-synthesized CaCO$_3$ (FIG. 6A), 5MgCaCO$_3$ (FIG. 6B), 10MgCaCO$_3$ (FIG. 6C), 15MgCaCO$_3$ (FIG. 6D) and EDX mapping for 10MgCaCO$_3$ (FIG. 6E). The image of the as-synthesized CaCO$_3$ indicates that the material is composed of large cubic particles. The surface of the as synthesized single crystal CaCO$_3$ has a porous structure, most likely due to the use of hydrothermal synthesis. The surface of pure calcium carbonate is normally smooth, as indicated by the SEM images of calcite in [Tong H, et. al., Biomaterials, 2004, 25, 17, 3923-3929]. Doping of CaCO$_3$ with 5 mol % Mg$^{2+}$ produces multiple layers of smaller particles of CaCO$_3$ (FIG. 6B). These layers of particles are porous. Increasing the amount of doping of Mg$^{2+}$ to 10 mol % produces even smaller agglomerated particles as shown in FIG. 6C. Among the three Mg$^{2+}$-doped CaCO$_3$ matrices, 10MgCaCO$_3$ has the smallest particles. At higher magnification, holes and pores could be observed in the SEM image of 10MgCaCO$_3$. FIG. 6D indicates that increasing Mg$^{2+}$ doping further has the opposite effect where the particles get larger.

Figure 7A:
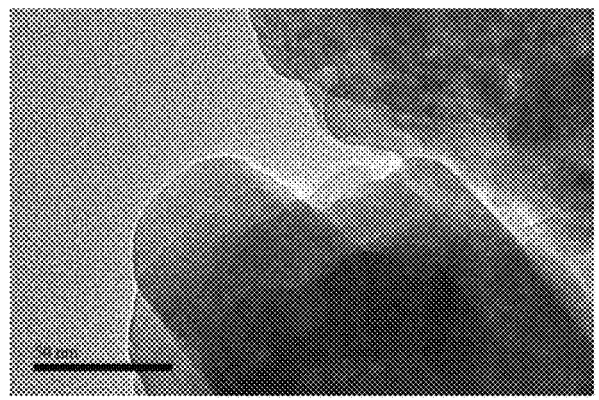
FIGS. 7A-7C are transmission electron microscopy (TEM) results, where
Figure 7B:
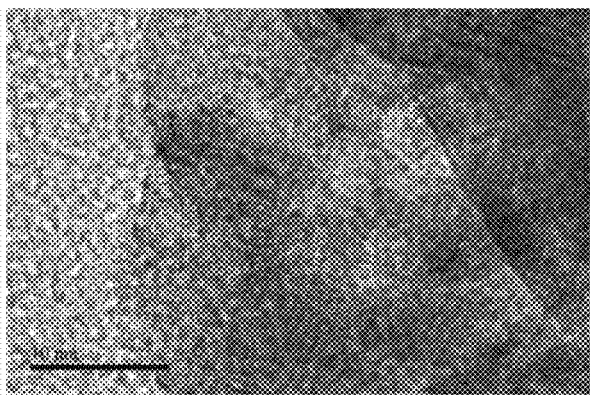
Figure 7C:
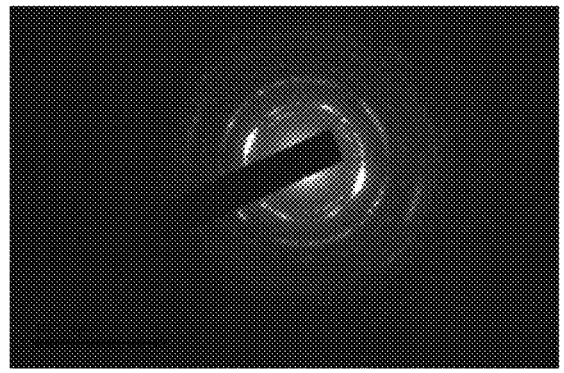

The EDS of 10MgCaCO$_3$ depicted in FIG. 6E confirms the presence of Mg, Ca, C, and O. The atomic percentages of Ca and Mg in 10MgCaCO$_3$ are 5.5 at % and 0.9 at %, respectively. The percentage of Ca atoms with respect to the total concentration of Ca and Mg is 85.9%, and hence the percentage of Mg is 14.1%. These values are not very far from the expected percentages of 90% and 10% for Ca and Mg, respectively. The deviation from the expected values can be due to the non-uniform distribution of the Mg atoms. The area of the sample used to obtain the EDS most likely contains more Mg atoms than it is supposed to have if the Mg atoms were uniformly distributed. Peaks due to gold atoms (Au) are also present in the EDS spectrum due to the application of a gold coating during SEM analysis. The results of the characterization of the three as-synthesized samples using XRD, FTIR, and SEM, indicate that 10MgCaCO$_3$ sample has special properties. Thus, the 10MgCaCO$_3$ sample was further characterized using TEM, pore size distribution and BET surface area determination. The TEM images of 10MgCaCO$_3$ depicted in FIG. 7A-7B indicate that all the particles are arranged layer by layer. The selected area electron diffraction (SAED) pattern (see the FIG. 7C) is obtained from the layered area of the sample marked with a white circle. The spacing between the lattice fringes is 0.210±0.004 nm (FIG. 7B) Moreover, the SAED pattern (FIG. 7C) contains rings that are not continuous, which suggests that the 10MgCaCO$_3$ powders are not single-crystalline.

Effect of Pore the Size Distribution and Pore Volume

Figure 8A:
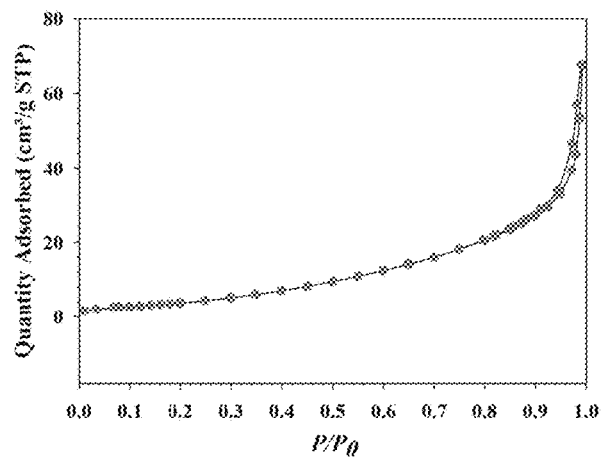
FIGS. 8A-8B are BET analysis results, where

A sharp N$_2$ adsorption-desorption peak of 10MgCaCO$_3$ was observed in the high P/Po range indicating that the material contains both large mesopores to macropores (FIG. 8A). As shown in FIG. 8A, 10MgCaCO$_3$ exhibits type IV adsorption and desorption isotherms accompanied by small H3 hysteresis loops. The calculated BET surface area is 9.5 m$^2$g$^{-1}$. The pore volume, estimated from the amount of gas adsorbed, is 0.035 cm$^3$g$^{-1}$. Through the analysis of the results in FIG. 8B, the pore size distribution plots indicate that the porosity of 10MgCaCO$_3$ has two mesopores at around 15 nm and 18 nm and a broad type peak at 20-110 nm. The sharp increase in the amount of N$_2$ adsorbed at a relative pressure of 1 indicates the existence of macropores [Liu D, et. al., J Colloid Interface Sci, 2012, 388, 176-184]. This feature confirms the co-existence of macropore and mesopore structures, as shown in the SEM images.

Figure 8B:
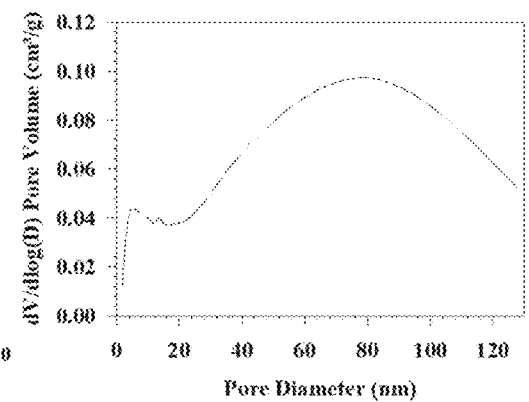

An interesting feature of PEG/10MgCaCO$_3$ PCM is the existence of two types pore structures described above, which may play a crucial role in enhancing the latent heat of the PCM by holding a substantial quantity of PEG. Very small pores alter the crystalline behavior of a matrix, and thus, the material may not be able to relax to its lowest energy state. Very large pores are also not suitable as they cannot confine the melted PCM within the matrix. The mesoporous structures strongly favor the absorption of PEG by capillary forces, which enhances the thermal dependability of the PEG/10MgCaCO$_3$ PCM during melting and freezing cycles. FIG. 8B shows that the PEG/10MgCaCO$_3$ sample has a very low pore volume, probably due to the incorporation of PA species into the stacking pores of 10MgCaCO$_3$ sample.

XPS Characterization

Figure 9A:
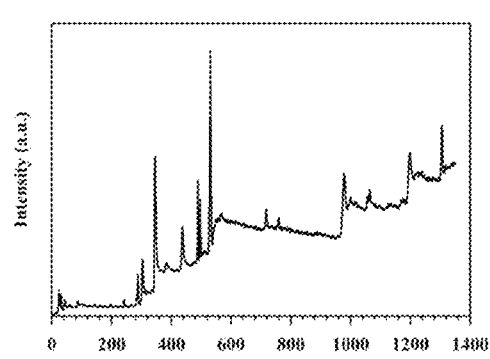
FIGS. 9A-9E are X-ray photoelectron spectra of a sample of $10MgCaCO_3$, where
Figure 9B:
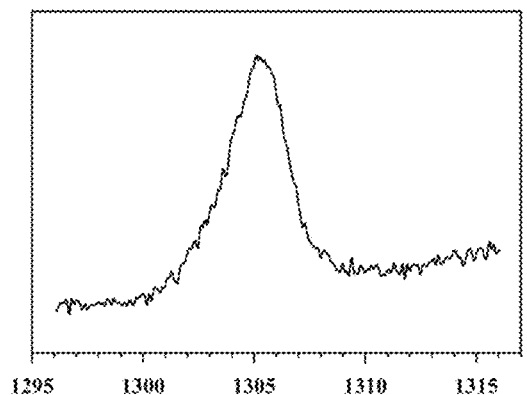
Figure 9C:
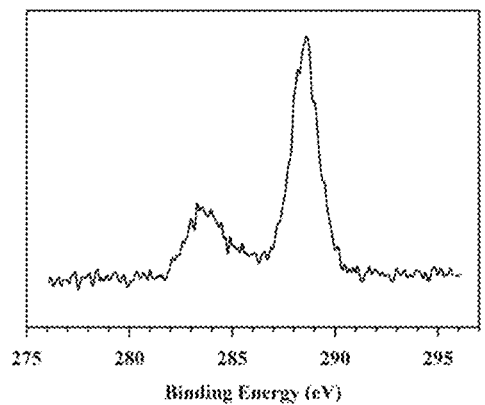
Figure 9D:
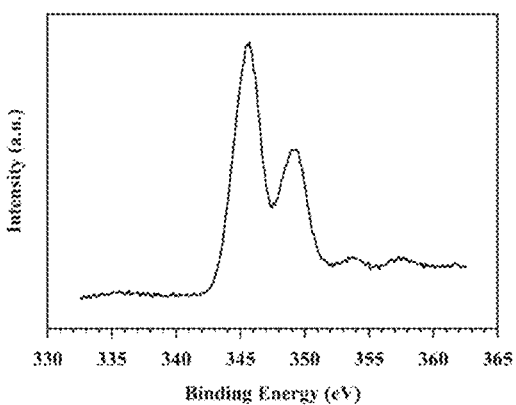
Figure 9E:
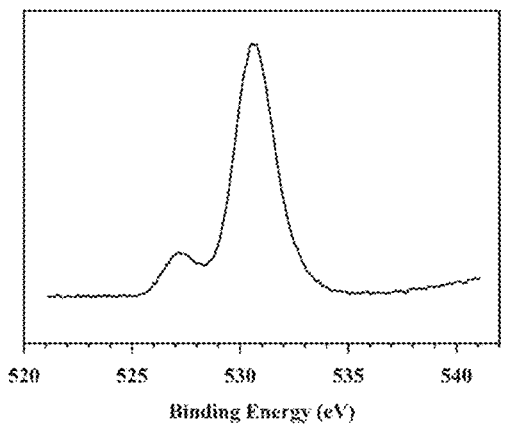

As shown in FIGS. 9A-9E, characteristic peaks due to magnesium, calcium, oxygen, and carbon located on the surface are present in the spectrum. At high resolution, two Ca 3d XPS peaks can be distinguished at 527.5 and 530.2 eV due to spin-orbit splitting. The surface concentration of Ca is 1.44 at %, as analyzed by XPS. The Mg is core level spectrum is resolved into three component peaks, as shown in FIG. 9A. The component peak at high binding energy may be assigned to magnesium hydroxide. The 2nd component peak is attributed to Mg and the 3rd component peak is attributed to magnesium oxide. The peaks at 282, 282.5, 284.3, and 286.3 are probably due to the hydroxyl groups of PEG and C—OH and/or O—H, respectively (not shown in FIG. 9A). The OH group can play a vital role in reducing the supercooling effect. Two O 1 s XPS peaks are observed at 284.2 and 289.3 eV for the as-prepared sample. The C is spectrum has two peaks at 527.3 and 531.2 eV as shown in FIG. 9E.

Thermal Stability

Figure 10A:
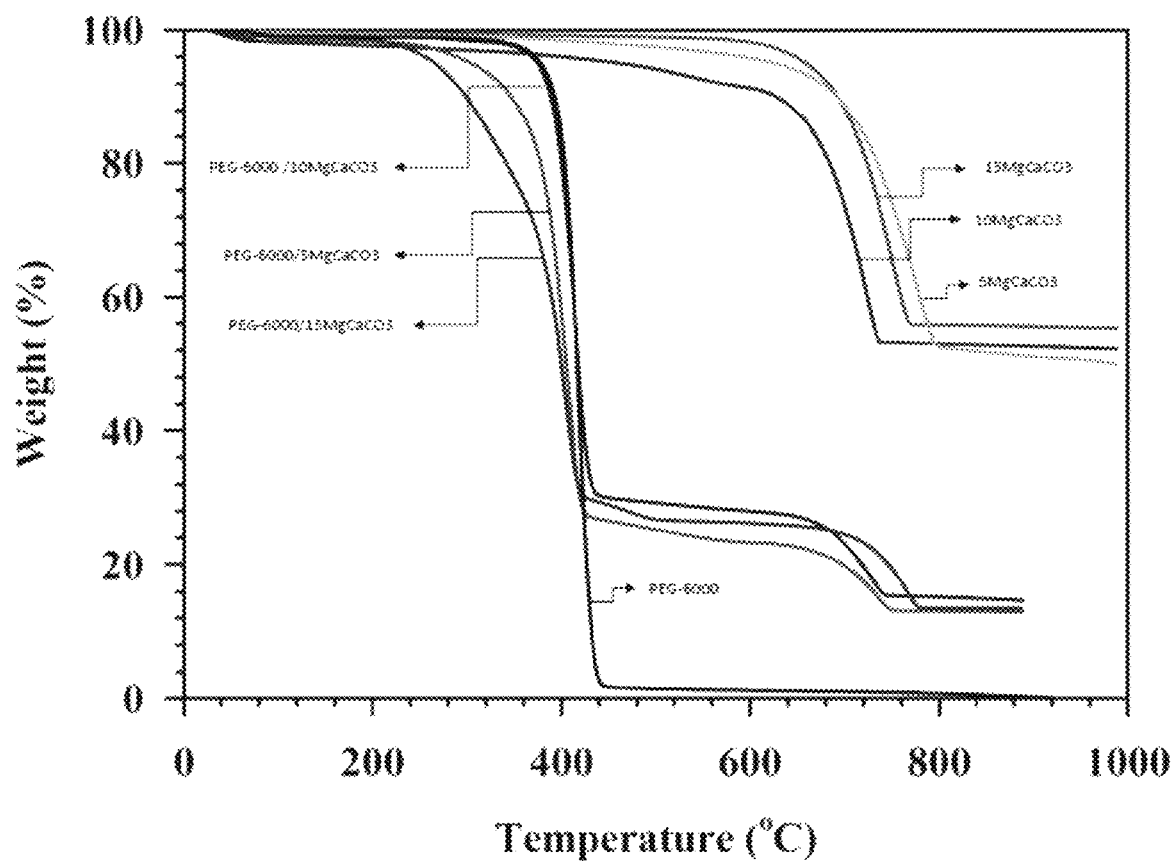
FIGS. 10A-10B are thermogravimetric analysis plots for the synthesized carbonate matrices, organic phase-change substance, and the composite phase-change materials, where

FIG. 10A depicts the TGA curves of pure PEG (black line), as-synthesized 5MgCaCO$_3$ (light green line), as-synthesized 10MgCaCO$_3$ (light blue line), as-synthesized 15MgCaCO$_3$ (light red line), PEG/5MgCaCO$_3$ composite (dark green line), PEG/10MgCaCO$_3$ composite (dark blue line), and PEG/15MgCaCO$_3$ composite (dark red line). The TGA analysis was performed under an atmosphere of argon at a heating rate of 5° C./min. The results in FIG. 10A indicate that the matrices start to decompose into CaO and CO$_2$ at higher temperatures near 600° C. At 800° C., the weight loss due to the decomposition of the matrices of 5MgCaCO$_3$, 10MgCaCO$_3$, and 15MgCaCO$_3$ is 47.55%, 47.02%, and 44.19%, respectively. At about 440° C., pure PEG starts to decompose, and the PEG decomposition is complete (weight loss is 100%) at about 440° C. For the composites, the weight loss occurred in the range of 400° C. to 640° C., most likely due to the removal of the organic molecules present in the composite. According to the weight of the constituents, the composites are expected to contain 28.6% (0.2 g) of the matrix and 71.4% (0.5 g) of PEG. The weight percentage of these composites remaining at 500° C. is 25.29%, 29.22%, and 26.78% for PEG/5MgCaCO$_3$, PEG/10MgCaCO$_3$, and PEG/15MgCaCO$_3$, respectively. The inorganic porous support matrix of PEG/10MgCaCO$_3$ seems to enhance the thermal stability of PEG by forming a protective shelter. The weight loss percentage of PEG/10MgCaCO$_3$ is 70.78%. The lower degradation temperature of the composites PEG/5MgCaCO$_3$ and PEG/15MgCaCO$_3$ is not well-understood and requires further studies. However, all the composites are stable up to almost 260° C., which is considerably higher than their working-temperature. The fabricated composites possess good thermal stability, and hence, are promising for application in energy storage systems.

Figures 10B, 11A:
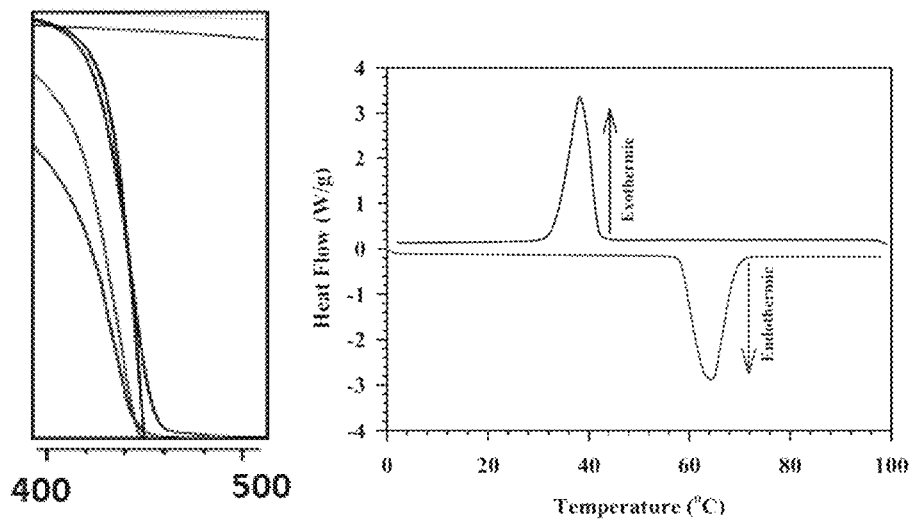
FIGS. 11A-11D are the differential scanning calorimetry plots for the organic phase-change substance and the composite phase-change materials, where

The enlarged section of FIG. 10B showing the TGA curves in the temperature range of 400° C.-500° C., indicates that the slope of the TGA curve for PEG/10MgCaCO$_3$ is slightly lower than that of pure PEG. Thus, the rate of heat absorption of PEG in PEG/10MgCaCO$_3$ is lower when the matrix is present. This indicates that the 10MgCaCO$_3$ matrix can inhibit the decomposition of the confined PEG [Guo Q, et. al., Thermochimica Acta, 2015, 613, 66-70].

Differential Scanning calorimetry

Figure 11B:
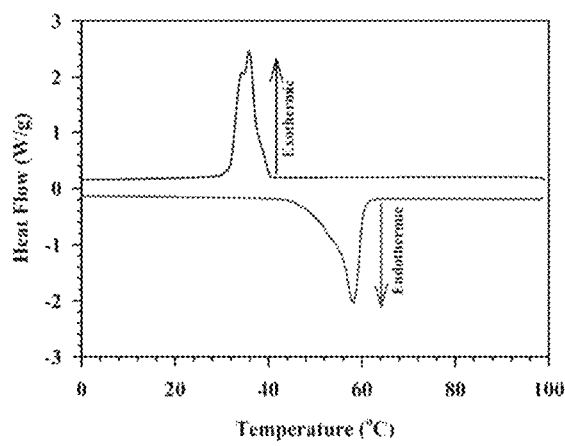
Figure 11C:
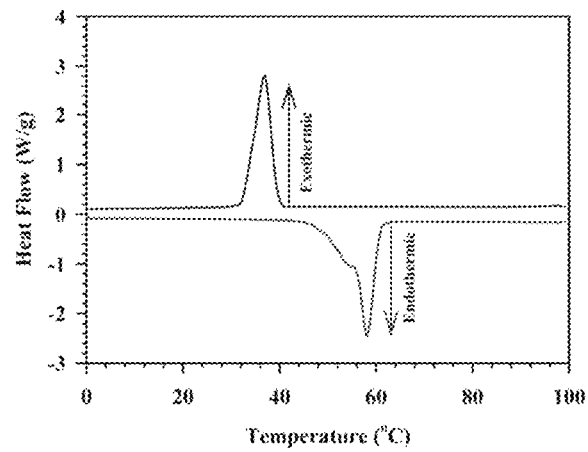
Figure 11D:
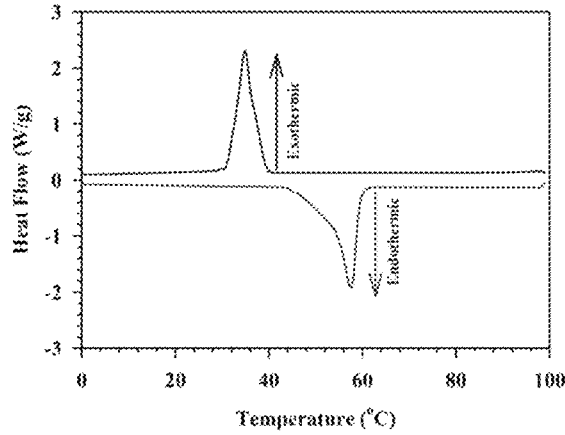

FIG. 11A-11D shows the melting-freezing DSC curves for pure PEG (FIG. 11A), PEG/5MgCaCO$_3$ (FIG. 11B), PEG/10MgCaCO$_3$ (FIG. 11C), and PEG/15MgCaCO$_3$ (FIG. 11D). The melting temperature (T$_m$), freezing temperature (T$_f$), latent heat of melting (ΔH$_m$), and latent heat of freezing (ΔH$_f$) for all the composites and pure PEG are listed in Table 1. The table also lists the energy storage efficiency (E), impregnation ratio (R), and the energy storage capacity (φ). These parameters were calculated based on the formulas in Qian et. al. [Qian T, et. al., Energy, 2015, 82, 333-340]. The enthalpies of pure PEG and the composites were calculated based on the area under the DSC curves for the freezing and melting processes. The melting enthalpy of pure PEG is 221.3 J/g, while its freezing enthalpy is 201.0 J/g. All composites showed partial loss in both latent heat of freezing and latent heat of melting due to the presence of the MgCaCO$_3$ matrix in the composites. The composite samples PEG/5MgCaCO$_3$, PEG/10MgCaCO$_3$, and PEG/15MgCaCO$_3$ displayed apparent melting enthalpy (η$_{apparent}$, apparent, computed taking the matrix mass into consideration) or impregnation ratio (R) of 60.8%, 68.9%, and 56.6%, respectively. These findings can be explained in terms of the heterogeneous nature of the composites, in which the mixing and/or penetration of PEG is less than ideal. This conclusion is supported by the shoulders of the narrow melting and solidification peaks (FIG. 11B). For comparison purposes, the DSC data of PEG-6000/mesoporous calcium silicate (MCS) ss-PCM are included in Table 1. The latent heat of the composite denoted ss-CPCM4 matches the highest latent heat achieved for PEG6000/MCS composites (Table 1). Also, the PEG to supporting matrix ratio of about 7:3 of the PEG6000/MCS composites is similar to that of the composites used in this study. Published latent heat data of PEG and ss-CPCM4 from Qian, et. al. were used to calculate R, E, and φ. The results indicate that PEG/10MgCaCO$_3$ performs slightly better with an impregnation ratio of 68.9% compared to 66.7% for ss-CPCM4, while E and φ of PEG/10MgCaCO$_3$ are also higher.

TABLE 1

DSC results of pure PEG-6000 (PEG), PEG/5MgCaCO$_3$, PEG/10MgCaCO$_3$, and PEG/15MgCaCO$_3$ composite PCMs, and comparison with that of different PEG composite PCMs in literature.

| Sample | T$_f$ (° C.) | T$_m$ (° C.) | ΔH$_f$ (J/g) | ΔH$_m$ (J/g) | ΔT$_s$ | R % | E % | φ |
|---|---|---|---|---|---|---|---|---|
| PEG (6000) | 39.50 | 63.84 | 201.0 | 221.3 | 24.34 | — | — | — |
| PEG-6000/5MgCaCO$_3$ | 35.77 | 54.36 | 116.3 | 134.5 | 18.59 | 60.8 | 59.4 | 97.7 |
| PEG-6000/10MgCaCO$_3$ | 36.54 | 55.17 | 134.4 | 152.5 | 18.63 | 68.9 | 67.9 | 98.6 |
| PEG-6000/15MgCaCO$_3$ | 35.07 | 53.12 | 107.1 | 125.3 | 18.05 | 56.6 | 55.0 | 97.2 |
| PEG1000/MgO | 18.30 | 34.4 | — | 61.62 | 16.1 | 64.6 | — | — |
| Above from: Yonggan, H, et. al., Thermochimica Acta, 2015, 604, 45-51 | | | | | | | | |
| PEG-10,000/SiO$_2$ | — | 61.61 | — | 162.9 | — | — | — | — |
| Above from: Wang W, et. al., Applied Energy, 2009, 86, 2, 170-174 | | | | | | | | |
| PEG-1000/SiO$_2$—β-AlN | 45.13 | 60.41 | 161.4 | 132.9 | 15.28 | — | — | — |
| Above from: Wang W, et. al., Appl Energy, 2009, 86, 7-8, 1196-1200 | | | | | | | | |
| PEG-6000/CaO$_4$Si (ss-CPCM4) | 44.10 | 57.03 | 106.8 | 122.1 | 12.93 | 66.7 | 64.5 | 96.8 |
| Above from: Qian T, et. al., Energy, 2015, 82, 333-340. | | | | | | | | |

Figure 12:
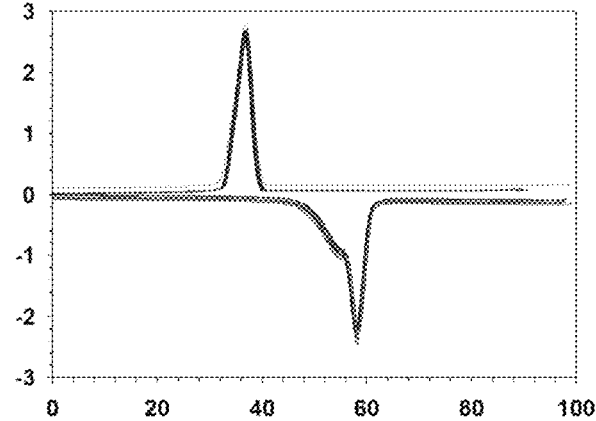
FIG. 12 depicts the results for multiple cycles of differential scanning calorimetry on a single sample of PEG-6000/$10MgCaCO_3$ composite phase-change material showing no change in the heat flow or loss of PEG-6000.

The impregnation ratio of PEG/10MgCaCO$_3$ (68.91%) was calculated according to the formula in Qian, et. al. The energy storage efficiency for all composites is in the range of 55.0%-67.9%, with PEG/10MgCaCO$_3$ possessing the highest efficiency and PEG/15MgCaCO$_3$ the lowest. The thermal storage capability of all composites indicates that almost all PEG molecules efficiently release/store energy through the transition of phases. The extent of supercooling was calculated based on the difference between the solidifying and melting temperatures, ΔTs, according to Qian, et. al. ΔTs of pure PEG (PEG-6000), PEG/5MgCaCO$_3$, PEG/10MgCaCO$_3$, and PEG/15MgCaCO$_3$ is 24.34° C., 18.59° C., 18.63° C., and 18.05° C., respectively. The largest decrease of supercooling of 23.5% was observed for PEG/10MgCaCO$_3$. Ten cycles of DSC curves of PEG/10MgCaCO$_3$ are depicted in FIG. 12. Both exothermal and endothermal curves do not change with cycling, indicating that the composite has a long life cycle with good thermal reliability.

Thermal Conductivity

The very low thermal conductivity of PEG is not desirable for practical applications. When mixed with carbon and/or inorganic materials, the thermal conductivity of PEG is enhanced. The thermal conductivity of CaCO$_3$, MgO, and PEG is 2.19 Wm$^{-1}$K$^{-1}$, 48.00 Wm$^{-1}$K$^{-1}$, and 0.212 Wm$^{-1}$K$^{-1}$, respectively. However, the thermal conductivity of the PEG/10MgCaCO$_3$ composite is 0.3456 Wm$^{-1}$K$^{-1}$, and the results in Table 2 show that the thermal conductivity of PEG/10MgCaCO$_3$ is ~62% higher than that of PEG. A higher thermal conductivity is essential to enhance the heat energy storage and release or shorten the time required for the process. In fact, a higher thermal conductivity plays a vital role in increasing the rate of charging/discharging, which can save time and increase the efficiency when these materials are applied for waste heat recovery and solar energy harnessing.

TABLE 2

Thermal conductivity of the pure PEG-6000 and PEG-6000/5MgCaCO$_3$, PEG-6000/10MgCaCO$_3$ and PEG-6000/15MgCaCO$_3$ PCM composite.

| Sample | Thermal Conductivity (Wm$^{-1}$K$^{-1}$) |
| --- | --- |
| PEG-60000 | 0.2124 |
| PEG-6000/5MgCaCO$_3$ | 0.2389 |
| PEG-6000/10MgCaCO$_3$ | 0.3456 |
| PEG-6000/15MgCaCO$_3$ | 0.3134 |

The invention claimed is:

1. A composite phase-change material, comprising:
an organic phase-change substance; and
a carbonate matrix of the formula Ca$_{1-x}$Mg$_x$CO$_3$ wherein x=0.01 to 0.25;
wherein the carbonate matrix is crystalline and has a hierarchical pore structure of mesopores and macropores.

2. The composite phase-change material of claim 1, wherein the carbonate matrix is in the form of nanoparticles having a mean size of 400 to 700 nm.

3. The composite phase-change material of claim 1, wherein the mesopores have a modal size from 5 to 15 nm and the macropores have a modal size from 60 to 100 nm.

4. The composite phase-change material of claim 1, wherein the carbonate matrix has a pore volume of 0.025 to 0.045 cm$^3$g$^{-1}$.

5. The composite phase-change material of claim 1, wherein the carbonate matrix has a surface area of 7.5 to 12.5 m$^2$/g.

6. The composite phase-change material of claim 1, wherein the organic phase-change substance is present in an amount of 60 to 80 wt % based on a total weight of the composite phase-change material.

7. The composite phase-change material of claim 1, wherein the organic phase-change substance is at least one selected from the group consisting of a polyether, a polyolefin, a polyamide, a polycarbonate, a polyester, a petroleum wax, an animal-derived wax, a plant-derived wax, a fatty acid or fatty acid ester, and a sugar alcohol.

8. The composite phase-change material of claim 1, wherein the organic phase-change substance is a polyether having an enthalpy of fusion of 93 to 270 J/g.

9. The composite phase-change material of claim 1, wherein the organic phase-change substance is polyethylene glycol having a weight average molecular weight in a range of 4,000 to 8,000 Da.

10. The composite phase-change material of claim 1, wherein the organic phase-change substance has a melting temperature that is 16.5 to 21.34° C. different from its solidifying temperature.

11. The composite phase-change material of claim 1, wherein 80 to 100 vol % of a pore volume of the composite phase-change material is occupied by the organic phase-change sub stance.

12. The composite phase-change material of claim 11, wherein less than 10 wt % of the organic phase-change substance located in the mesopores and macropores, relative to a total weight of the organic phase-change substance located in the mesopores and macropores, exits the mesopores and macropores when the organic phase-change substance undergoes a melting or a solidifying transition.

13. The composite phase-change material of claim 1, which has a latent heat of freezing of 107 to 201 J/g and a latent heat of melting of 123 to 221 J/g.

14. The composite phase-change material of claim 1, which has a thermal conductivity of 0.220 to 0.45 W·m$^{-1}$·K$^{-1}$.

15. A method for forming the composite phase-change material of claim 1, the method comprising:
hydrothermally reacting calcium nitrate, magnesium nitrate, and a carbonate base or bicarbonate base in water in a closed vessel at a temperature of 120 to 280° C. for 12 to 36 h to form a precipitate,
washing and drying the precipitate to form the carbonate matrix,
mixing the carbonate matrix with a solution comprising the organic phase-change substance and an organic solvent to form an impregnation mixture, and
drying the impregnation mixture to form the composite phase-change material.

16. The method of claim 15, wherein the hydrothermally reacting consists essentially of mixing calcium nitrate, magnesium nitrate in water, adding a carbonate base or bicarbonate base until the pH is 7.5 to 9.5, stirring for 1-3 hours, transferring to a closed vessel, and heating to a temperature of 120 to 280° C. for 12 to 36 h.

17. The method of claim 15, wherein the mixing comprises stirring the carbonate matrix and the solution for 1 to 60 minutes and ultrasonicating for 1 to 60 minutes.

18. The method of claim 15, wherein the solution comprises the organic phase-change substance at a concentration of 7.5 to 12.5 g/L and the impregnation mixture comprises the carbonate matrix at a concentration of 3 to 5 g/L.

19. The method of claim 15, wherein the drying comprises heating the impregnation mixture to 60 to 100° C. for 12 to 36 hours.

20. A building material comprising the composite phase-change material of claim 1.

* * * * *